US008565425B2

(12) United States Patent
Oonuma et al.

(10) Patent No.: US 8,565,425 B2
(45) Date of Patent: Oct. 22, 2013

(54) RECORDING MEDIUM, METHOD FOR MANUFACTURING THE SAME AND APPARATUS FOR REPRODUCING THE SAME

(75) Inventors: Kensuke Oonuma, Tokyo (JP); Hiroshi Okuda, Tokyo (JP); Koichi Chotoku, Tokyo (JP); Toshiyuki Katsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 562 days.

(21) Appl. No.: 12/841,009

(22) Filed: Jul. 21, 2010

(65) Prior Publication Data

US 2011/0026708 A1 Feb. 3, 2011

(30) Foreign Application Priority Data

Jul. 31, 2009 (JP) ................................ P2009-179241

(51) Int. Cl.
  G04F 7/04 (2006.01)
  H04N 7/16 (2011.01)
(52) U.S. Cl.
  USPC ............... 380/201; 380/216; 726/26; 726/32; 726/33
(58) Field of Classification Search
  USPC .................... 380/201, 216; 726/26, 32, 33
  See application file for complete search history.

(56) References Cited

U.S. PATENT DOCUMENTS

| 6,526,223 | B1 | 2/2003 | Mori et al. |
| 6,564,006 | B1 * | 5/2003 | Mori et al. .................... 386/241 |
| 6,963,531 | B2 * | 11/2005 | Ko et al. .................... 369/275.3 |
| 7,565,060 | B2 | 7/2009 | Hamada et al. |
| 7,657,847 | B2 * | 2/2010 | Ichikawa et al. ............... 715/838 |
| 7,889,966 | B2 * | 2/2011 | Nomura et al. ............... 386/278 |
| 7,949,231 | B2 * | 5/2011 | Seo et al. ........................ 386/336 |
| 8,063,894 | B2 * | 11/2011 | Yamada ........................ 345/204 |
| 2005/0111832 | A1 * | 5/2005 | Okauchi et al. .................. 386/95 |
| 2005/0244135 | A1 * | 11/2005 | Yahata et al. .................... 386/52 |
| 2007/0247985 | A1 * | 10/2007 | Ueda et al. .................... 369/47.1 |
| 2008/0092080 | A1 * | 4/2008 | Ichikawa et al. ............... 715/838 |
| 2008/0101457 | A1 * | 5/2008 | Toma et al. ............... 375/240.01 |
| 2008/0131090 | A1 * | 6/2008 | Mae et al. ...................... 386/124 |
| 2009/0028526 | A1 * | 1/2009 | Kuroda ........................... 386/95 |
| 2009/0086966 | A1 * | 4/2009 | Haruki et al. .................... 380/44 |
| 2009/0327710 | A1 * | 12/2009 | Yoshizawa .................... 713/162 |

FOREIGN PATENT DOCUMENTS

| JP | 2006-293939 | 10/2006 |
| JP | 3334795 | 8/2008 |
| JP | 4228767 | 12/2008 |
| WO | WO 00/63915 | 10/2000 |

* cited by examiner

Primary Examiner — Krisna Lim
(74) Attorney, Agent, or Firm — Finnegan, Henderson, Farabow, Garrett & Dunner LLP

(57) ABSTRACT

There is disclosed a method for generating data for a recording medium. The method includes receiving original content data representing a plurality of still images and identifying a first subset of the still images to be recorded with copy-protection and a second subset of the still images to be recorded without copy-protection. The method also includes converting data representing the first subset into moving image data and copy-protecting the moving image data. The method also includes generating new content data, the new content data including the copy-protected moving image data and data representing the second subset.

30 Claims, 22 Drawing Sheets

FIG. 14
Mi

| MATERIAL NUMBER | STORED LOCATION |
|---|---|
| 1 | /movie/001 |
| 2 | /movie/002 |
| ⋮ | ⋮ |
| 4 | http://www.absdbcdaed.com/index.html |
| 10 | /picture/page001 |
| 11 | /picture/page003 |
| ⋮ | ⋮ |
| XX | /picture/page003zoom01 |
| ⋮ | ⋮ |

MATERIAL USED AS STILL IMAGE WITHOUT BEING ENCRYPTED { (material numbers 10, 11, ..., XX)

FIG. 15
CPi

MATERIAL NUMBER "1"

| CHAPTER NUMBER | CORRESPONDING PAGE NUMBER | PAGE TOP? |
|---|---|---|
| 1 | 2 | TRUE |
| 2 | 4 | TRUE |

⋮

MATERIAL NUMBER "10"

| CHAPTER NUMBER | CORRESPONDING PAGE NUMBER | PAGE TOP? |
|---|---|---|
| 1 | 1 | TRUE |

⋮

MATERIAL NUMBER "11"

| CHAPTER NUMBER | CORRESPONDING PAGE NUMBER | PAGE TOP? |
|---|---|---|
| 1 | 3 | TRUE |

⋮

MATERIAL NUMBER "XX"

| CHAPTER NUMBER | CORRESPONDING PAGE NUMBER | PAGE TOP? |
|---|---|---|
| 1 | 3 | FALSE |

⋮

FIG. 16A
MATERIAL NUMBER "1"

| LINK NUMBER | CHAPTER NUMBER | x-COORDINATE | y-COORDINATE | WIDTH | HEIGHT | MATERIAL NUMBER OF TRANSITION DESTINATION | PAGE NUMBER OF TRANSITION DESTINATION |
|---|---|---|---|---|---|---|---|
| 1 | 1 | 310 | 130 | 130 | 30 | 5 | 10 |
| 2 | 2 | 230 | 20 | 150 | 80 | 6 | 12 |

LS1 — Li — LG1

FIG. 16B
MATERIAL NUMBER "10"

| LINK NUMBER | CHAPTER NUMBER | x-COORDINATE | y-COORDINATE | WIDTH | HEIGHT | MATERIAL NUMBER OF TRANSITION DESTINATION | PAGE NUMBER OF TRANSITION DESTINATION |
|---|---|---|---|---|---|---|---|
| 1 | 1 | 20 | 250 | 150 | 50 | 13 | 15 |
| 2 | 1 | 50 | 200 | 30 | 20 | XX | 3 |
| 3 | 1 | 250 | 300 | 100 | 30 | 4 | — |

LS10 — Li — LG10

FIG. 16C
MATERIAL NUMBER "11"

| LINK NUMBER | CHAPTER NUMBER | x-COORDINATE | y-COORDINATE | WIDTH | HEIGHT | MATERIAL NUMBER OF TRANSITION DESTINATION | PAGE NUMBER OF TRANSITION DESTINATION |
|---|---|---|---|---|---|---|---|
| 1 | 1 | 40 | 280 | 220 | 70 | 19 | 22 |

LS11 — Li — LG11

RECORDING MEDIUM, METHOD FOR MANUFACTURING THE SAME AND APPARATUS FOR REPRODUCING THE SAME

BACKGROUND OF THE INVENTION

1. Field of the Invention

The present invention relates to a recording medium, a method for manufacturing the same and an apparatus for reproducing the same, which are suitably applied to recording content of published matter on a recording medium, such as a Blu-ray disc (registered trademark).

2. Description of the Related Art

Apparatuses for asynchronously reproducing moving images and audio data recorded on recording media, such as digital versatile discs (DVD) and Blu-ray discs, have been proposed (see, for example, Japanese Patents Nos. 3334795 and 4228767).

Systems for issuing and distributing electronic publication, i.e., systems for scanning images of published matters, such as newspapers and magazines, and distributing the scanned data in a file format that can be displayed on a web browser have also been proposed (see, for example, Japanese Unexamined Patent Application Publication No 2006-293939).

SUMMARY OF THE INVENTION

However, systems as disclosed in Patent Document 3 have had problems with copy-protection: images of published matters distributed in digital file formats may be copied and used by unauthorized, malicious users.

It is therefore desirable to provide a recording medium, a method for manufacturing the same and an apparatus for reproducing the same for implementing security management on data to be recorded on a recording medium without a significant increase in data volume.

Accordingly, there is disclosed a method for generating data for a recording medium. The method may include receiving original content data representing a plurality of still images; identifying a first subset of the still images to be recorded with copy-protection and a second subset of the still images to be recorded without copy-protection; converting data representing the first subset into moving image data; copy-protecting the moving image data; and generating new content data, the new content data including the copy-protected moving image data and data representing the second subset.

There is further disclosed a data storage medium for a playback apparatus. The data storage medium may include a content data structure comprising a plurality of still images, the still images representing related pages, the still images comprising: a first subset stored as copy-protected moving image data; and a second subset stored as non-copy-protected still image data; and a control data structure which, when accessed by the playback apparatus, causes the content data structure to be output in a sequence of the pages determined by the playback apparatus.

There is further disclosed a playback apparatus. The playback apparatus may include a drive configured to receive a data storage medium storing control data and content data representing a plurality of still images, the still images representing related pages, the still images comprising: a first subset stored as copy-protected moving image data; and a second subset stored as non-copy-protected still image data; and at least one processor configured to: read the copy-protected moving image data and the non-copy-protected still image data as playback data; and process the control data to cause the playback data to be output in a sequence of the pages determined by the playback apparatus.

BRIEF DESCRIPTION OF THE DRAWINGS

FIG. 14 is a schematic diagram illustrating material information recorded on a recording medium;

FIG. 15 is a schematic diagram illustrating chapter-page information provided for each material;

FIG. 16 is a schematic diagram illustrating link information provided for each material;

DESCRIPTION OF THE PREFERRED EMBODIMENTS

According to an embodiment, the still image data to be copy-protected can be recorded on a recording medium after being converted into encrypted moving image data and the still image data not to be copy-protected can be directly recorded on the recording medium. Thus, during reproduction of the recording medium, the encrypted moving image data and the still image data can be easily transitioned to each other in accordance with the transition control information while providing copy-protection and avoiding an increase in data volume efficiently. Thus, a method for manufacturing a recording medium for implementing security management on data to be recorded on a recording medium without a significant increase in data volume can be provided.

According to an embodiment, since only still image data to be copy-protected in accordance with a direction of a content creator is recorded as encrypted moving image data, the encrypted moving image data and the still image data can be transitioned easily in accordance with transition control information during reproduction of the recording medium while efficiently avoiding unauthorized copy of the data. Thus, a recording medium for implementing security management on data recorded thereon without a significant increase in data volume can be provided.

According to an embodiment, since only still image data to be copy-protected in accordance with a direction of a content creator is recorded on a recording medium as encrypted moving image data, the encrypted moving image data and the still image data can be transitioned easily in accordance with transition control information during reproduction of the recording medium while efficiently avoiding unauthorized copy of the data. Thus, an apparatus for reproducing a recording medium for implementing security management on data to be recorded on a recording medium without a significant increase in data volume can be provided.

Figure 1:
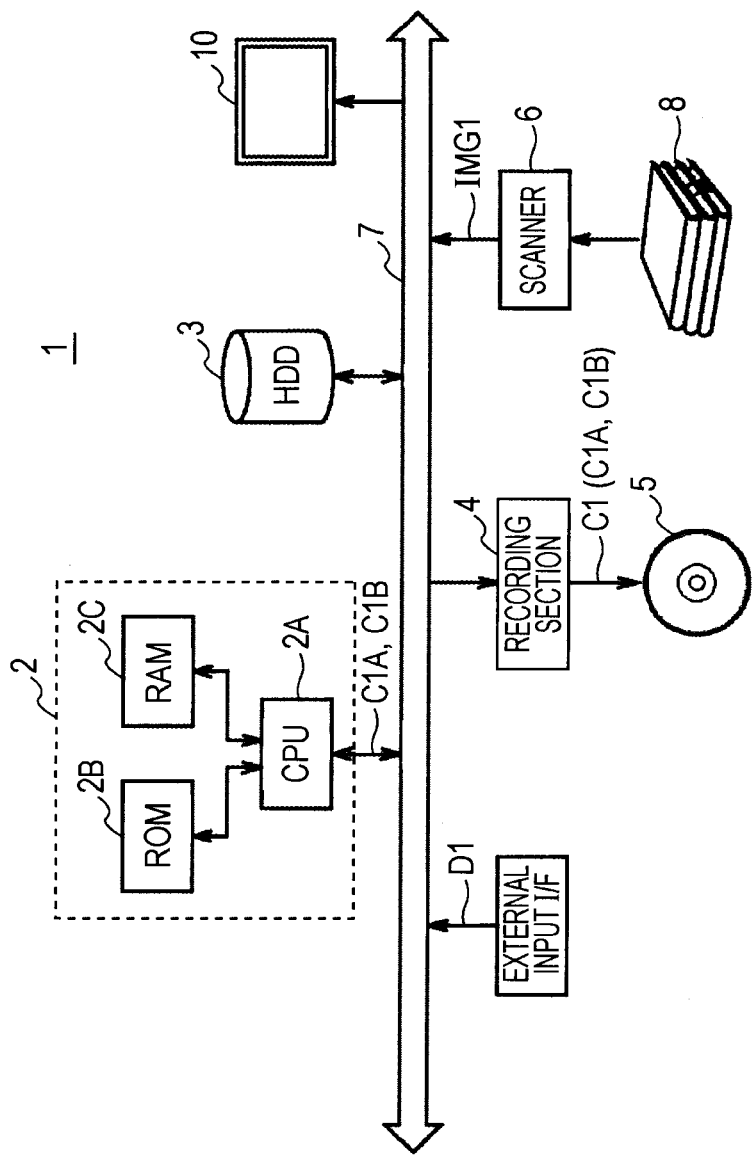
FIG. 1 is a schematic block diagram illustrating a configuration of a disc manufacturing apparatus according to an embodiment of the invention.

Hereinafter, embodiments for implementing the invention will be described. Description will be given in the following order.
1. Embodiment
2. Other Embodiments 1. Embodiment 1-1. Configuration of Disc Manufacturing Apparatus A disc manufacturing apparatus 1 for manufacturing commercially-supplied discs (BD-ROMs) according to an embodiment of the invention is illustrated in FIG. 1. The BD-ROM is a Blu-ray disc 5 on which content data C1 of a published matter, i.e., a printed matter 8, is recorded.

The disc manufacturing apparatus 1 also records a Blu-ray Disc-Java (registered trademark) application (hereinafter, "BD-J application") on the Blu-ray disc 5 together with the content data C1.

The BD-J application is an application program described in Java (registered trademark) language. The BD-J application provides connection to networks, such as the Internet, and access to link destinations recorded on the Blu-ray disc 5 to download information.

Here, the content data C1 recorded on the Blu-ray disc 5 will be described in detail with reference to FIGS. 2 to 6 illustrating exemplary displays of reproduced data of the Blu-ray disc 5.

Figure 2:
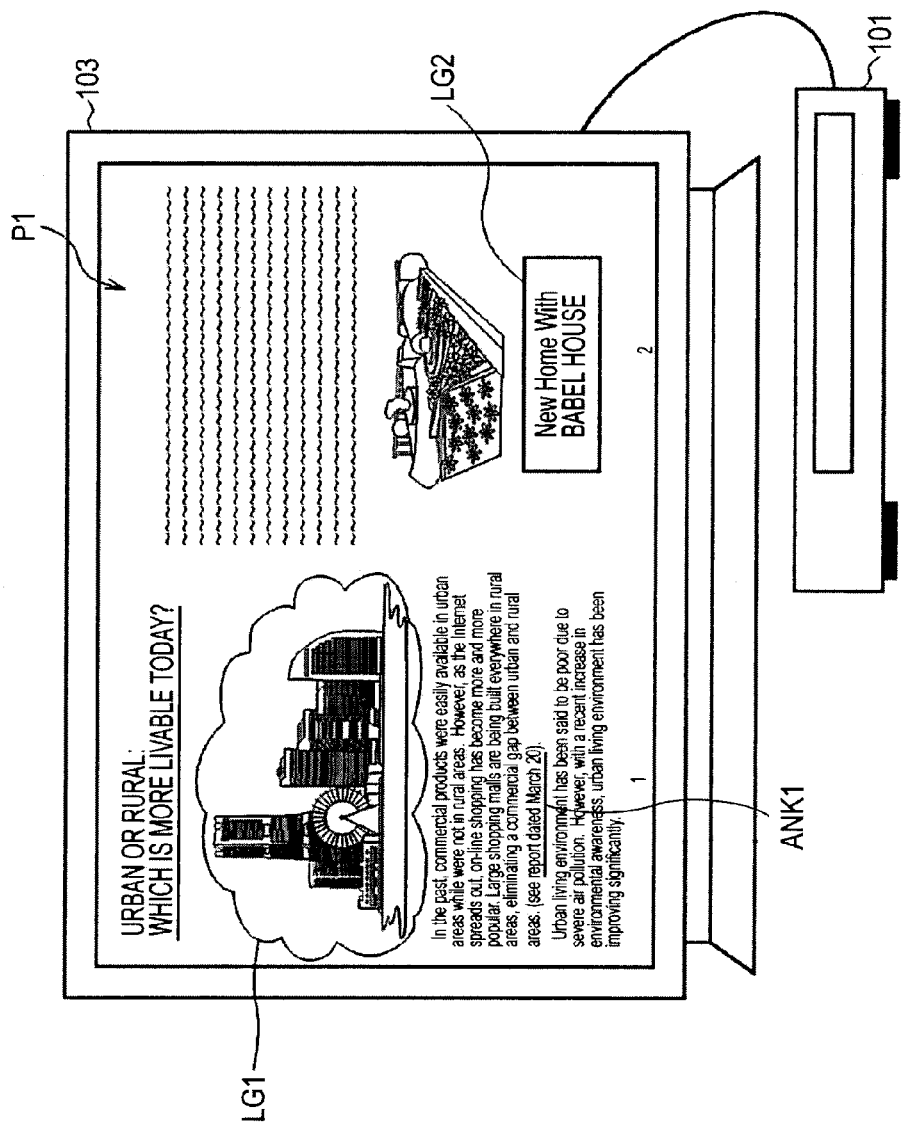
FIG. 2 is a schematic diagram illustrating facing page of content of a published matter.

FIG. 2 illustrates facing page P1 including first and second pages of the content data C1 when the Blu-ray disc 5, which is a commercially-supplied disc, is reproduced by the BD recorder 101.

The facing page P1 includes a link image LG1 for linking to a moving image, an underlined anchor ANK1 for linking to another page and a link image LG2 for linking to another site on the network.

When any of the link images LG1, LG2 and the anchor ANK1 is selected via a remote controller (not illustrated) of the BD recorder 101, the BD recorder 101 transitions the facing page P1 to a link destination defined by each link and displays the linked page on a television receiver 103.

Figure 3:
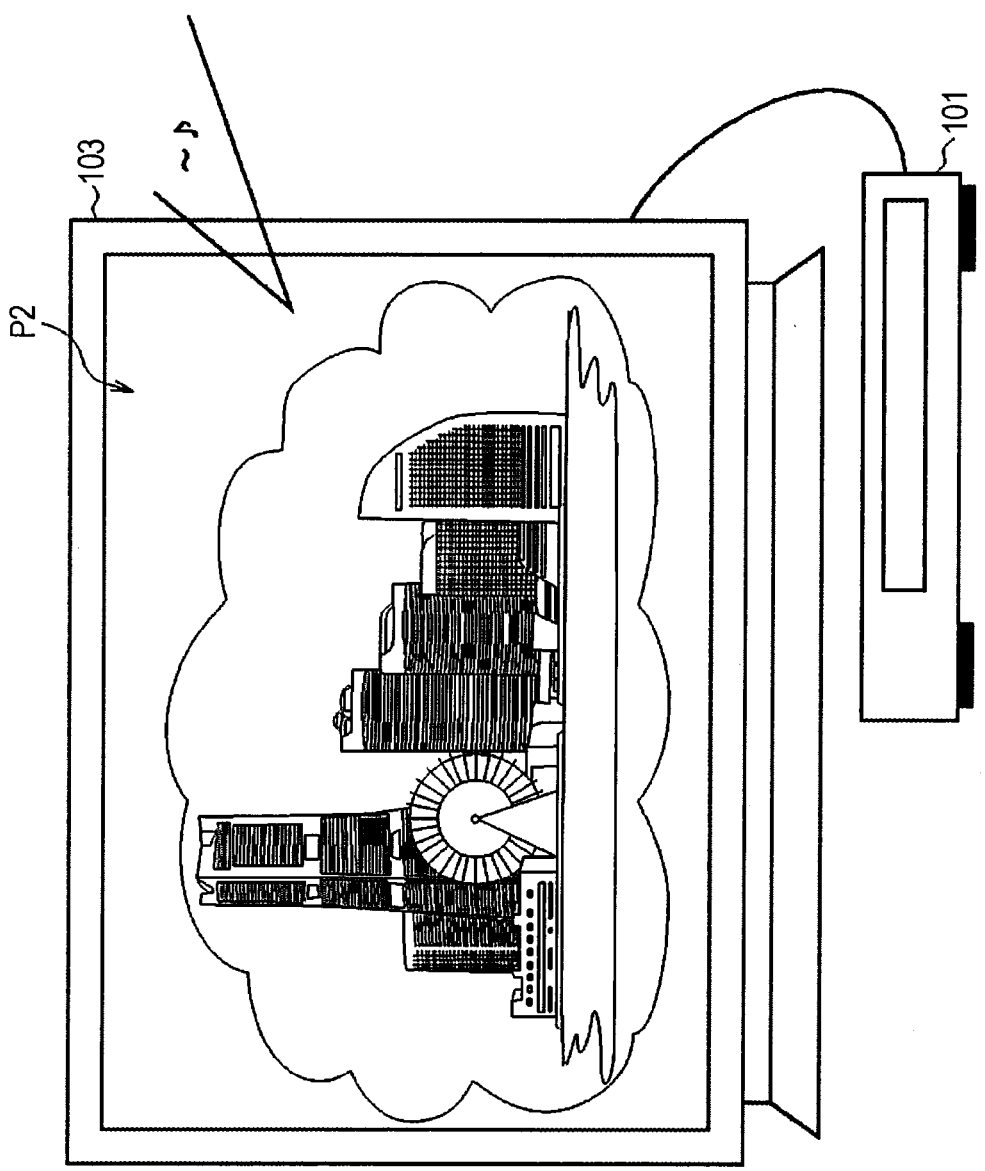
FIG. 3 is a schematic diagram illustrating a display of a linked moving image page of the content of the published matter.

In practice, when the link image LG1 is selected on the facing page P1, the facing page P1 are transitioned to a link destination, i.e., a moving image page P2, defined by the link of the link image LG1. The moving image page P2 is then displayed as illustrated in FIG. 3.

Figure 4:
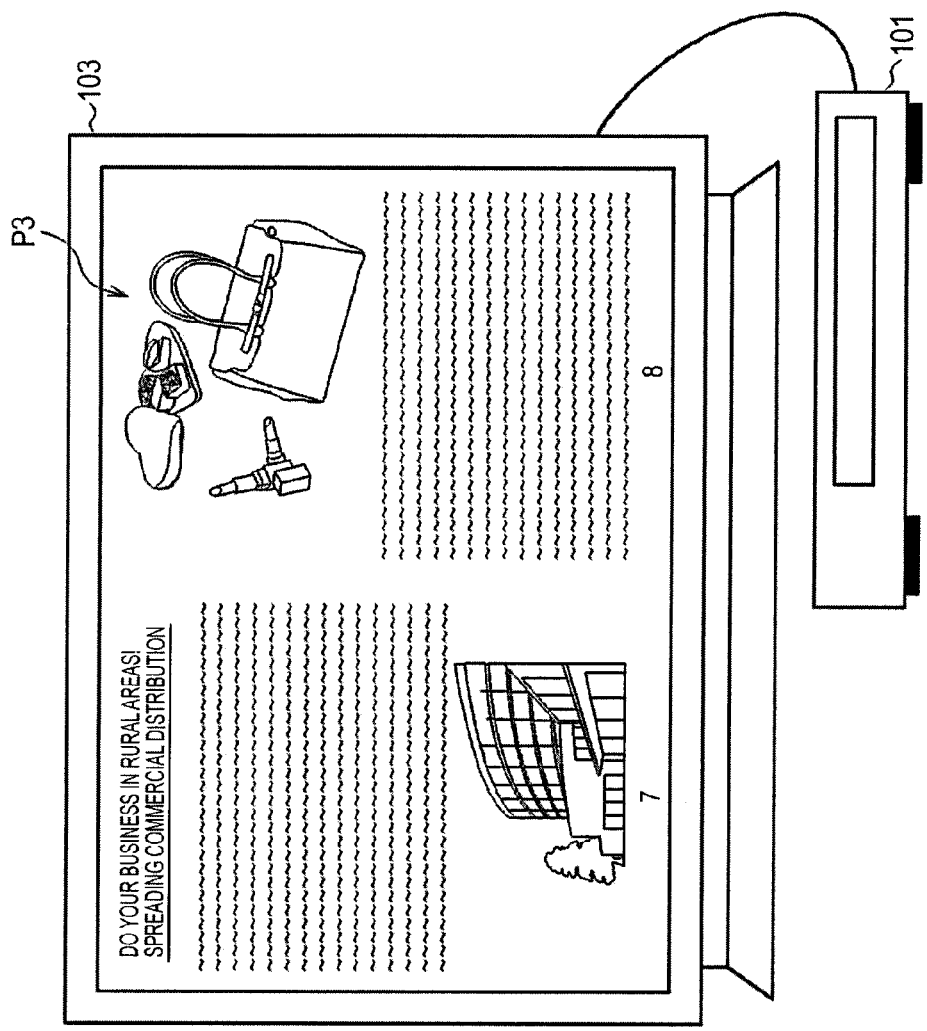
FIG. 4 is a schematic diagram illustrating a display of another linked page of the content of the published matter.

When the anchor ANK1 is selected on the facing page P1, the facing page P1 are transitioned to a link destination, i.e., another page P3 defined by the link of the anchor ANK1. The page P3 is displayed as illustrated in FIG. 4.

Figure 5:
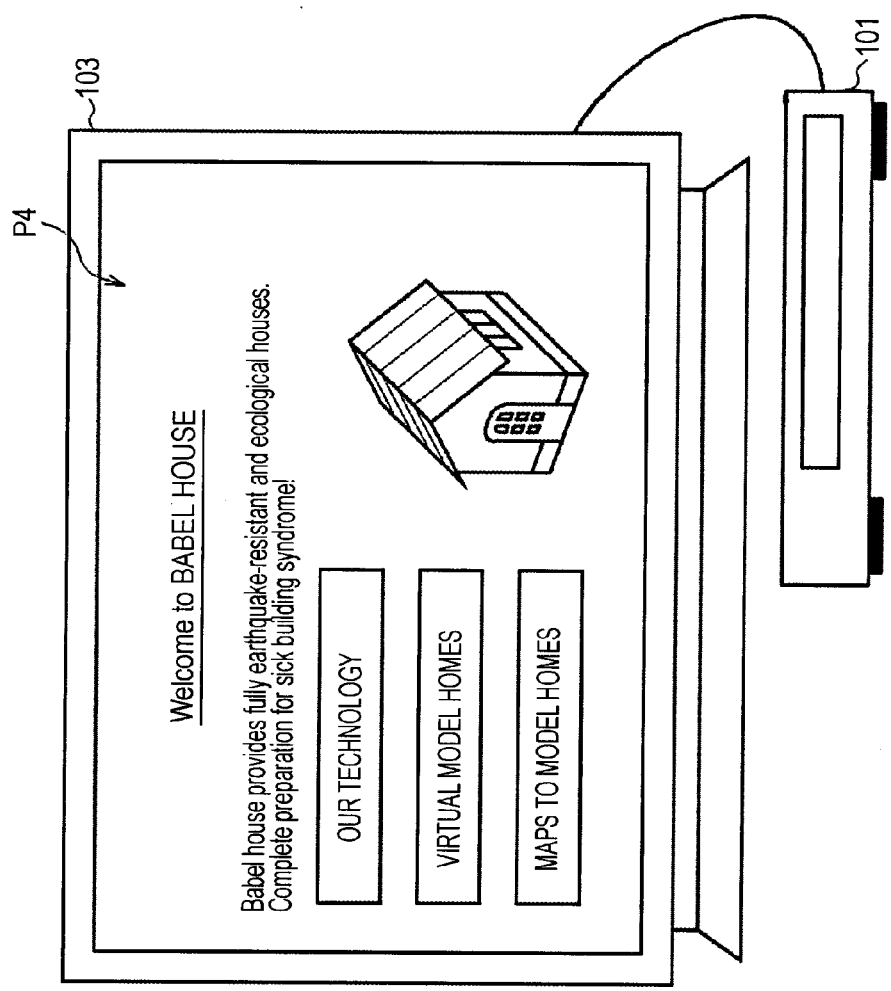
FIG. 5 is a schematic diagram illustrating a display of a linked site on a network.

When the link image LG2 is selected on the facing page P1, the BD recorder 101 accesses, in accordance with the BD-J application, a site on the network defined by the link of the link image LG2 and the facing page P1 are transitioned to a link destination, i.e., a front page P4. The front page P4 is displayed as illustrated in FIG. 5.

Figure 6:
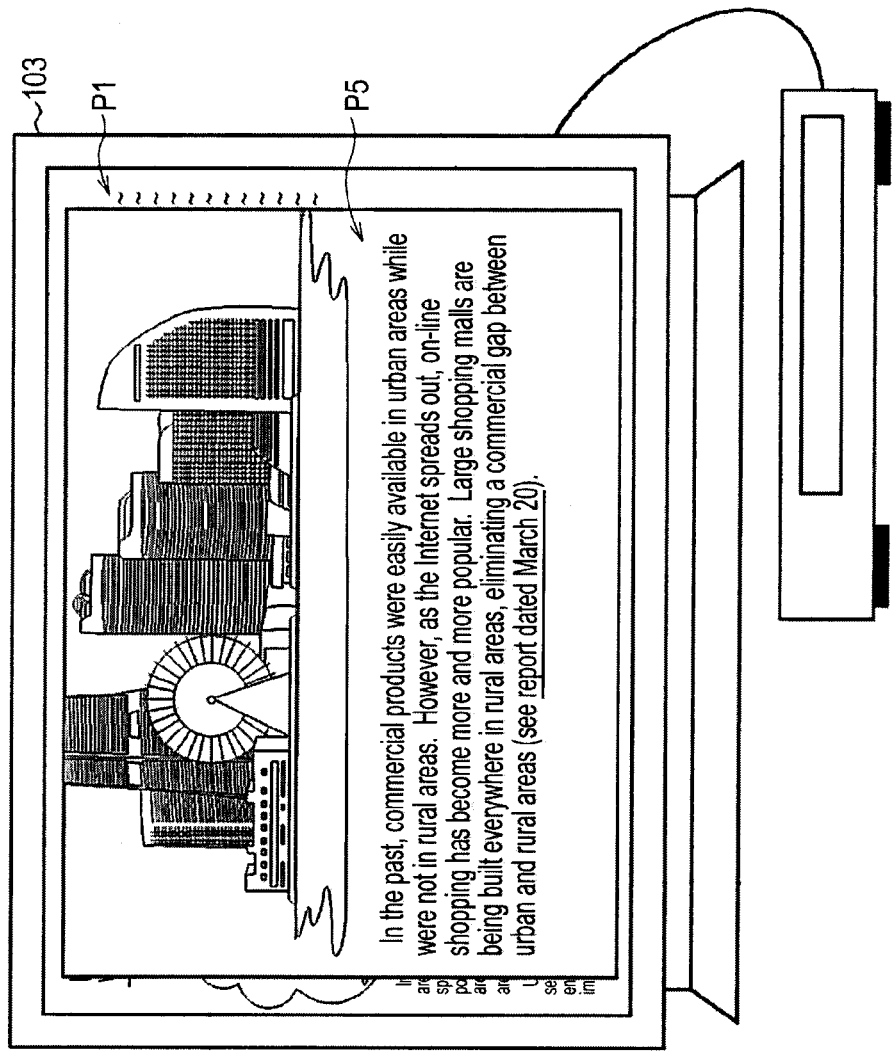
FIG. 6 is a schematic diagram illustrating a partially enlarged display in accordance with a zooming operation.

When a zooming operation is performed with a cursor placed in a predetermined area on the facing page P1, the facing page P1 are transitioned to an enlarged image page P5 defined by a link correlated to the predetermined area in which the cursor is placed. The enlarged image page P5 is then displayed in a superimposed manner on the facing page P1 as illustrated in FIG. 6.

When a forward button is pressed on the remote controller with the facing page P1 being displayed, subsequent second facing page will be displayed. When a back button is pressed with the second facing page being displayed, the previous facing page P1 will be displayed.

When, for example, fifth facing page is specified by the remote controller with the facing page P1 being displayed, the fifth facing page will be displayed.

As illustrated in FIG. 1, a control section 2 is connected to a system bus 7 in the disc manufacturing apparatus 1. The control section 2 includes a central processing unit (CPU) 2A, a read only memory (ROM) 2B and a random access memory (RAM) 2C.

The CPU 2A controls the CPU 2A, the ROM 2B and RAM 2C so that basic processes of the disc manufacturing apparatus 1 are executed in accordance with a base program and an application program which are read from the ROM 2B or a hard disk drive 3 and then run on the RAM 2C.

Figure 7:
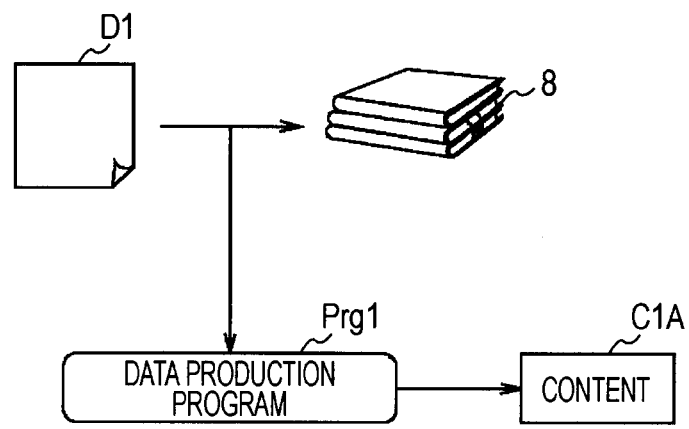
FIG. 7 is a schematic diagram illustrating a process (1) for creating content data to be recorded on a BD.

As illustrated in FIG. 7, DTP data D1 generated by, for example, a publishing company using a desktop publishing (DTP) software is usually sent to a printing company, where a printed matter 8, such as books, magazines, newspapers, leaflets and comics, is published on the basis of the DPT data D1.

In practice, the CPU 2A takes in the DTP data D1 via an external input interface 9 and temporarily stores the DTP data D1 in the hard disk drive 3.

The CPU 2A then converts the DTP data D1 into content data CIA of the published matter in accordance with an application program, i.e., a data control program Prg1 under predetermined conversion conditions or various parameters specified by a content creator.

The CPU 2A then records the content data CIA on the Blu-ray disc BD via a recording section 4. The CPU 2A can make the content creator visually confirm the process on a monitor 10.

The DTP data D1 may be data inherent to the DTP software or may be general-purpose data such as Portable Document Format (PDF).

Figure 8:
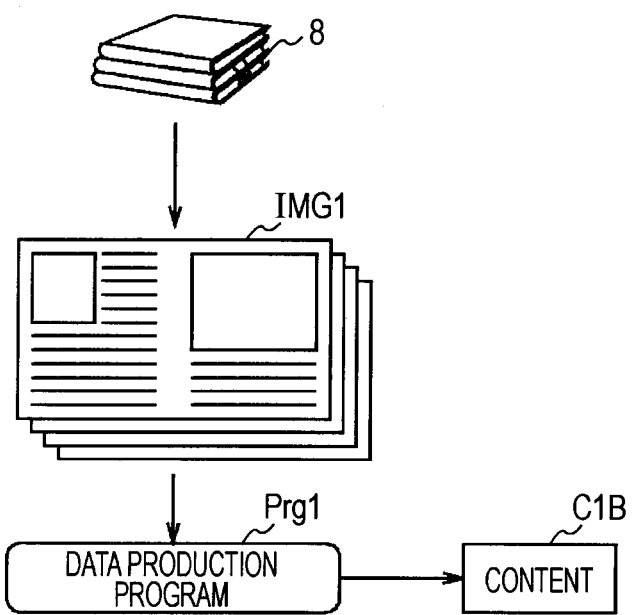
FIG. 8 is a schematic diagram illustrating a process (2) for creating content data to be recorded on a BD.

If no DTP data D1 of the printed matter 8 is provided, an original of the printed matter 8 is captured by a scanner 6 (see FIG. 1) and the CPU 2A temporarily stores acquired still image data IMG1 in the hard disk drive 3 as illustrated in FIG. 8.

The CPU 2A then converts the still image data IMG1 into content data C1B of the published matter in accordance with the data control program Prg1 on the basis of predetermined conversion conditions or various parameters specified by the content creator.

The CPU 2A then records the content data C1B on the Blu-ray disc 5 via the recording section 4. The CPU 2A can make the content creator visually confirm the process on a monitor 10.

1-2. Data Conversion

Figure 9:
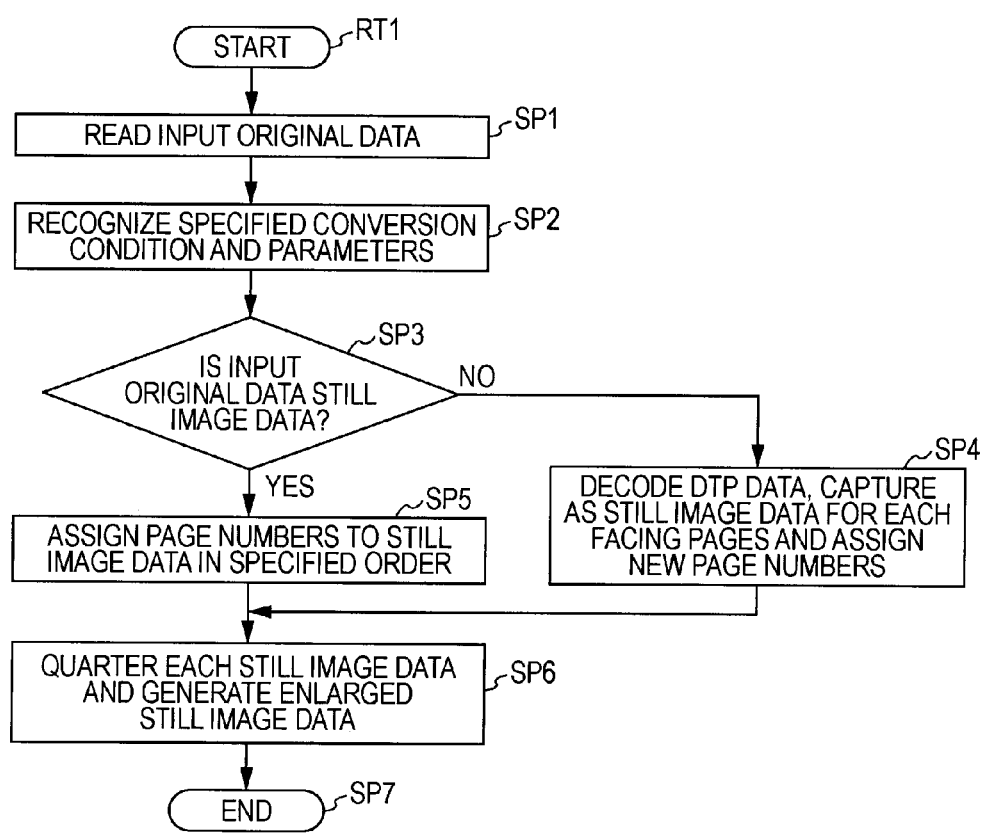
FIG. 9 is a flowchart illustrating a data conversion procedure.

A data conversion procedure will be described with reference to a flowchart in FIG. 9. In the procedure, as described above, the content of the printed matter 8 is converted into content data C1 (C1A and C1B) to be recorded on the Blu-ray disc 5.

A routine RT1 starts at a start step and then proceeds to the next step SP1. In step SP1, the CPU 2A reads the DTP data D1 captured via the external input interface 9 or the still image data IMG1 captured via the scanner 6 as input original data and the routine proceeds to the next step SP2.

In step SP2, the CPU 2A recognizes predetermined conversion conditions and various parameters specified by the content creator and the routine proceeds to the next step SP3.

In step SP3, the CPU 2A determines whether the input original data is still image data IMG1. If the result is negative, i.e., if the input original data is not still image data IMG1 but the DTP data D1, the routine proceeds to the next step SP4.

In step SP4, the CPU 2A decodes the DTP data D1, captures the still image data on the facing page basis and assigns page numbers to the captured still image data on the facing page basis and the routine proceeds to step SP6. The page number will be used by page transition control information (which will be described later).

In practice, the CPU 2A sequentially captures the still image data on the facing page basis including left and right pages of the content data C1 as illustrated in FIG. 2 and then assigns a new page number to the captured still image data. The new page number will be used by the page transition control information (which will be described later).

That is, a new page number "1" is assigned to a new first page, i.e., the facing page P1 of the first and second pages of the content data C1.

If, on the other hand, the result is affirmative in step SP3, i.e., the input original data is the still image data IMG1, the routine proceeds to the next step SP5.

In step SP5, as in step SP4, the CPU 2A assigns a new page number to the still image data IMG1 on the facing page basis in the order specified by the content creator and the routine proceeds to step SP6.

In step SP6, the CPU 2A generates enlarged still image data corresponding to enlarged image page P5 (see FIG. 6) by enlarging, with a predetermined magnification, each of quaterred areas of the still image data to which new page numbers are assigned. The routine proceeds to step SP7, where the process ends.

In this manner, the CPU 2A can convert the input original data into the content data C1 (C1A and C1B) which includes the still image data and the enlarged still image data to which new page numbers are assigned.

1-3. Encryption in Consideration of Copy-Protection

In the disc manufacturing apparatus 1, there will be the following problems during recording the still image data and the enlarged still image data of the content data C1 (C1A and C1B) directly on the Blu-ray disc 5.

When, for example, the Blu-ray disc 5 is reproduced on a personal computer, the still image data and the enlarged still image data, which are not encrypted, will be easily taken into a hard disk of the personal computer since the Blu-ray discs are thus specified.

Particularly in the BD-ROM format of the Blu-ray disc 5, there is no mechanism for encrypting still image data but only a mechanism for protecting video and sound streams of moving images through encryption.

In this circumstance, unauthorized copy of the still image data and the enlarged still image data recorded on the Blu-ray disc 5 can be made by malicious users, infringing the copyright or other confidentiality of the data.

Although it is possible to include an encrypting process in the BD-J application recorded on the Blu-ray disc 5, content of the encrypting process can be easily decoded since it can be easily visualized through decompilation by Java (registered trademark) language particularly in BD-ROMs. Thus, such an encrypting process is not practical.

1-3-1. Converting All Still Images into Moving Images and Encrypting

Figure 10:
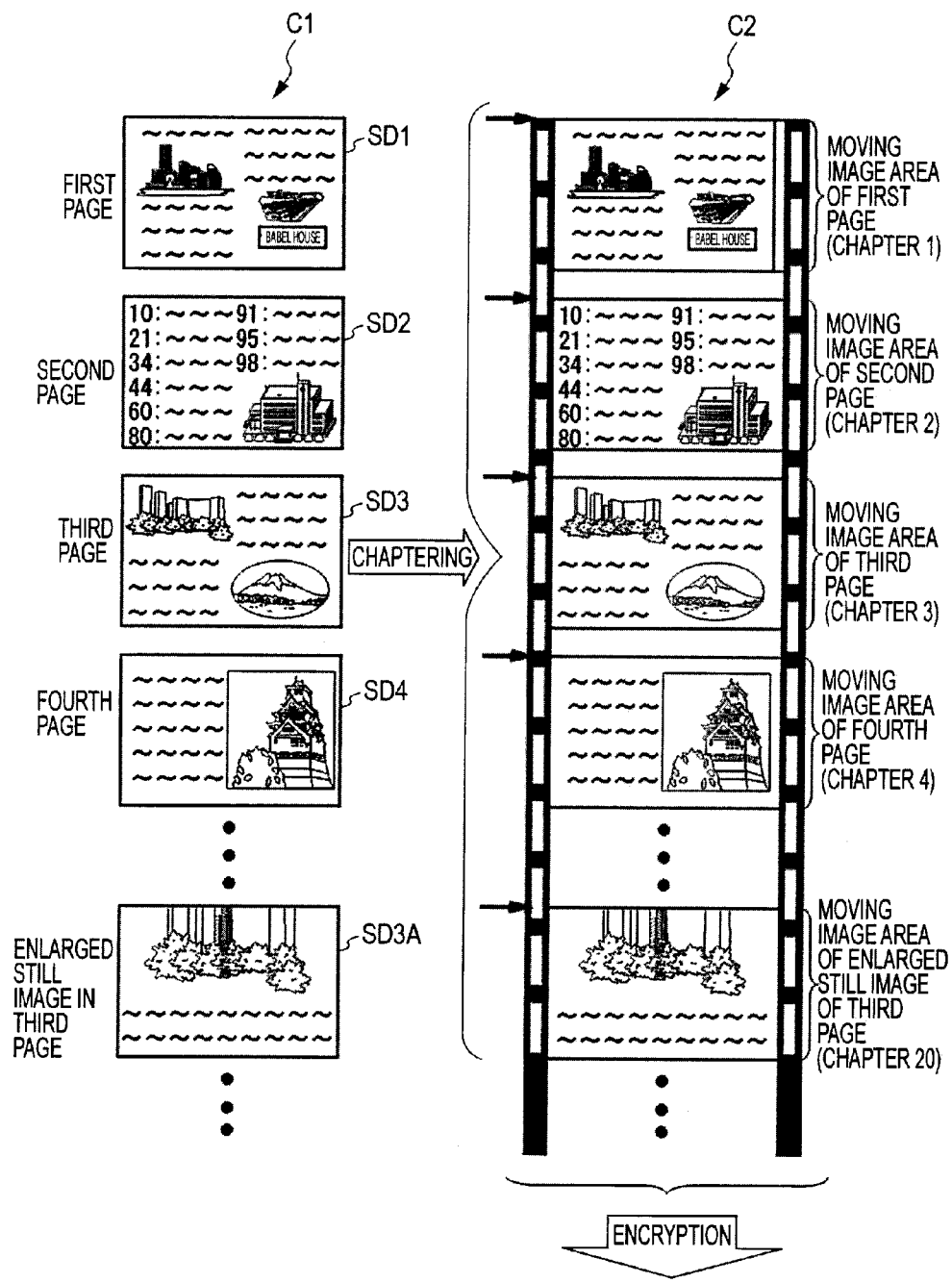
FIG. 10 is a schematic diagram illustrating an example in which all still images are converted into moving images and then encrypted.

In the disc manufacturing apparatus 1, it may be possible to record all the content data C1 is recorded on a Blu-ray disc 5 in the following manner. As illustrated in FIG. 10, the content data C1 is converted, beginning with still image data SD1 which is the first page, into moving data of 60-Hz frame frequency that may sequentially display the moving data for, for example, five seconds. The converted moving data is then encrypted in an advanced access content system (AACS) and is record on the Blu-ray disc 5.

In practice, in order to display the still image data SD1, which is the first page of the content data C1, as a 5-second moving image, the CPU 2A generates a total of about 300 frames of the still image data SD1 and encrypts the generated frames as a moving image area of a chapter 1 corresponding to the first page.

Similarly, in order to display the still image data SD2, which is the second page of the content data C1, as a 5-second moving image, the CPU 2A generates a total of about 300 frames of the still image data SD2 and encrypts the generated frames as a moving image area of a chapter 2 corresponding to the second page.

In this manner, regarding each of the third, fourth and subsequent pages of the content data C1, the CPU 2A generates a total of about 300 frames of still image data SD3, SD4 and subsequent data and then encrypts the generated data as moving image areas of the chapters 3, 4 and subsequent chapters corresponding to the third, fourth and subsequent pages.

In order to display enlarged still image data SD3A of, for example, the third page of the content data C1 as a 5-second moving image, the CPU 2A generates a total of about 300 frames of the enlarged still image data SD3A. The CPU 2A then encrypts the generated data as, for example, a moving image area of chapter 10 corresponded to an enlarged still image of the third page.

The CPU 2A converts the still image data SD1 to SD4, SD3A and other still image data of the total page of the content data C1 into moving image data and then encrypts the converted data so that the content data C1 can be converted into new content data C2 of the published matter including moving image data.

The CPU 2A then records the new content data C2 of the converted moving images on the Blu-ray disc 5. Thus, all the pages of the content data C1 are recorded in a copy-protected manner while remaining no still image data format.

Figure 11:
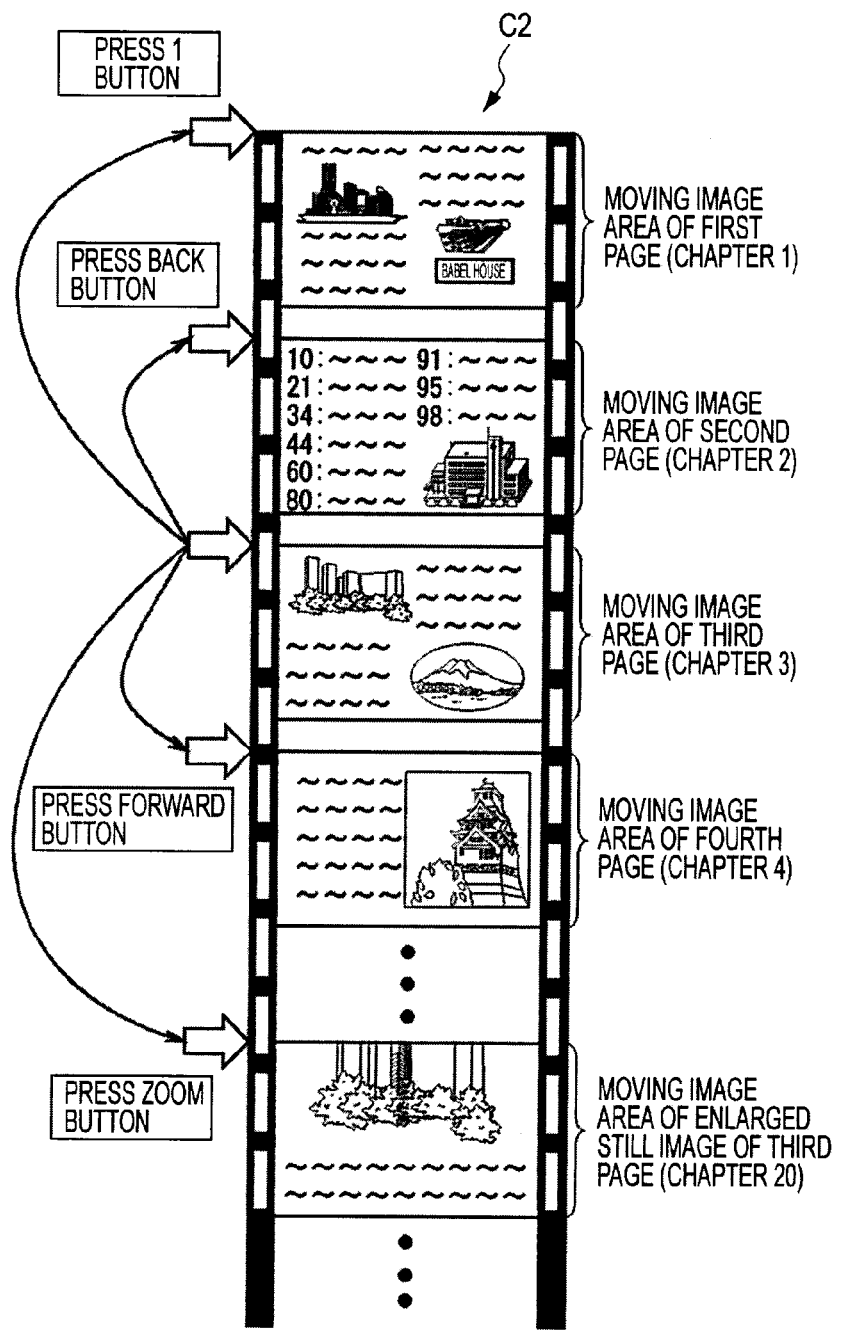
FIG. 11 is a schematic diagram illustrating an exemplary page transition with a third page being displayed.

Next, with reference to FIG. 11, page transition in the BD recorder 101 during reproduction of the Blu-ray disc 5 will be described.

During reproduction of the Blu-ray disc 5, when the forward button is pressed via a remote controller while, for example, a moving image area (chapter 3) of the third page of the new content data C2 is displayed on a television receiver 103, the BD recorder 101 starts reproduction of the moving image at the top of a moving image area (chapter 4) of the fourth page.

When the back button is pressed via the remote controller while the moving image area (chapter 3) of the third page is displayed on the television receiver 103, the BD recorder 101 starts reproduction of the moving image at the top of the moving image area (chapter 2) of the second page.

When "1" button for specifying the first page is pressed via the remote controller while the moving image area (chapter 3) of the third page is displayed on the television receiver 103, the BD recorder 101 starts reproduction of the moving image at the top of the moving image area (chapter 1) of the first page.

When the zoom button is pressed via the remote controller while the moving image area (chapter 3) of the third page is displayed on the television receiver 103, the BD recorder 101 starts reproduction of the moving image at the top of a previously generated moving image area (chapter 20) of the enlarged still image of the third page.

The BD recorder 101 repeatedly reproduces the 300 frames of the same content at the frame frequency of 60 Hz. Thus, although the frames are reproduced as moving images, a viewer considers the frames as a still image.

If it the still image data SD1 to SD4, SD3A and other still image data of all the pages of the content data C1 are converted into moving image data and then encrypted, the data volume to be stored on the Blu-ray disc 5 becomes significantly large and capacity of the Blu-ray disc 5 may be sometimes insufficient.

1-3-2. Converting only Some Still Images into Moving Images and Encrypting

Figure 12:
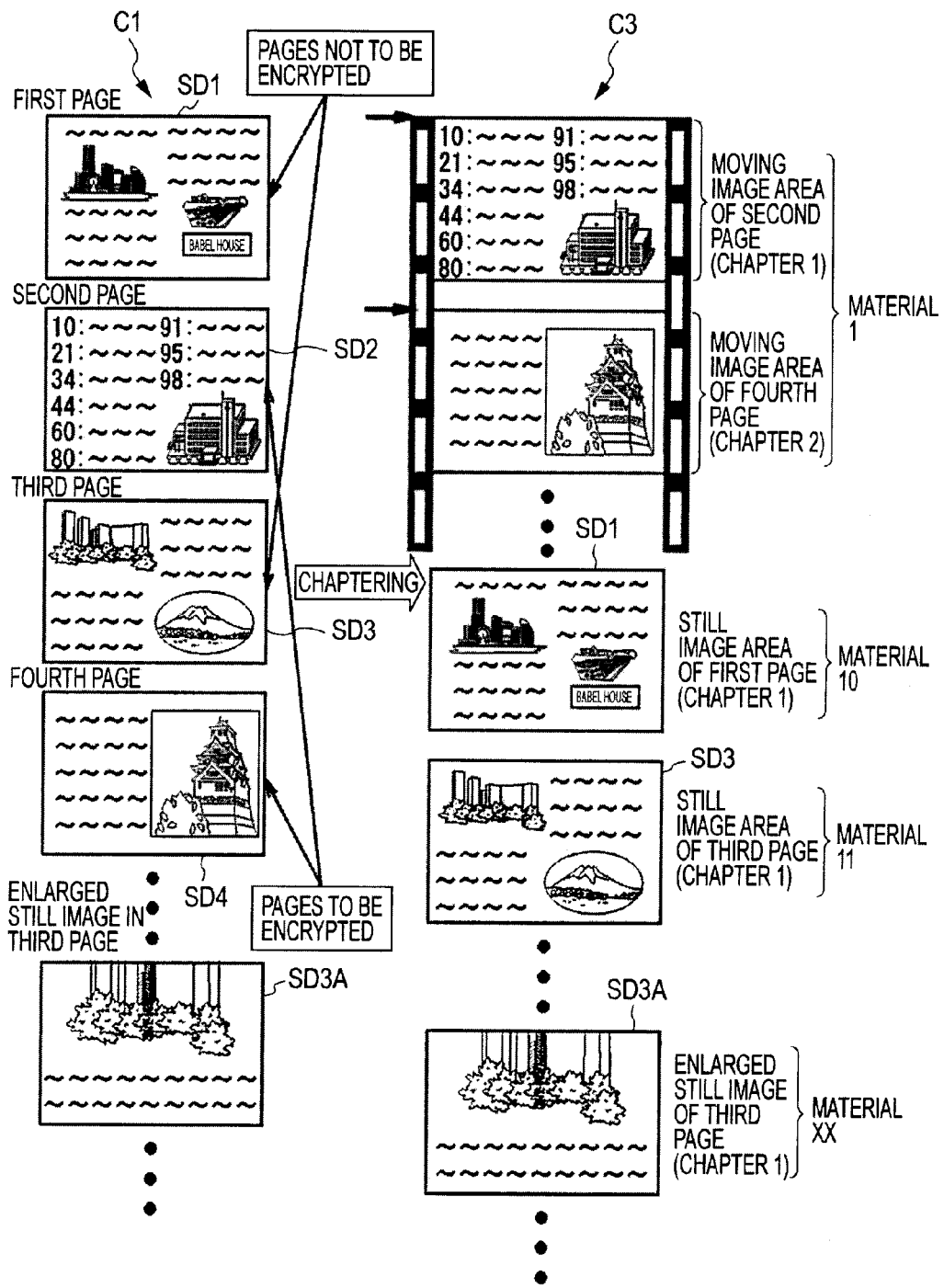
FIG. 12 is a schematic diagram illustrating an example in which only some of still images are converted into moving images and then encrypted.

In order to address the above problem, the CPU 2A selects, among all the pages of the content data C1, only a first subset of the still images, (i.e., the still image data SD2 of the second page and the still image data SD4 of the fourth page) as data to be encrypted in accordance with a direction from the content creator and then converts the first subset of the still images into moving image data as illustrated in FIG. 12.

This means that the CPU 2A does not consider a second subset of the still images (i.e., the still image data SD1 of the first page, the still image data SD3 of the third page and the enlarged still image data SD3 of the third page) of the content data C1 other than the second and the fourth pages, as the content to be encrypted and does not convert the second subset of the still images into moving image data.

Thus, the CPU 2A can generate new content data C3 of the published matter by dividing the content data C1, which is a single material, into materials 1, 10, 11, XX and other materials. The material 1 includes the moving image area of the second and fourth pages. The material 10 includes the still image of the first page. The material 11 includes the still image of the third page. The material XX includes the enlarged still image of the third page.

Since the material 1 includes the moving image area of the second page and the moving image area of the fourth page, the CPU 2A sets the moving image area of the second page as a chapter 1 and the moving image area of the fourth page as a chapter 2.

Since the material 10 includes the still image of the first page is the only one in the material 10, the CPU 2A sets the same as a chapter 1. Similarly, the CPU 2A sets material 11 including the still image of the third page and the material XX including the enlarged still image of the third page as a chapter 1.

That is, since the new content data C3 includes both the moving image area and the still image area, the CPU 2A divides the content data C1 into the new content data C3 including the materials 1 to 10, 11, XX and other materials and assigns chapter numbers on the material basis from "1."

Figure 13:
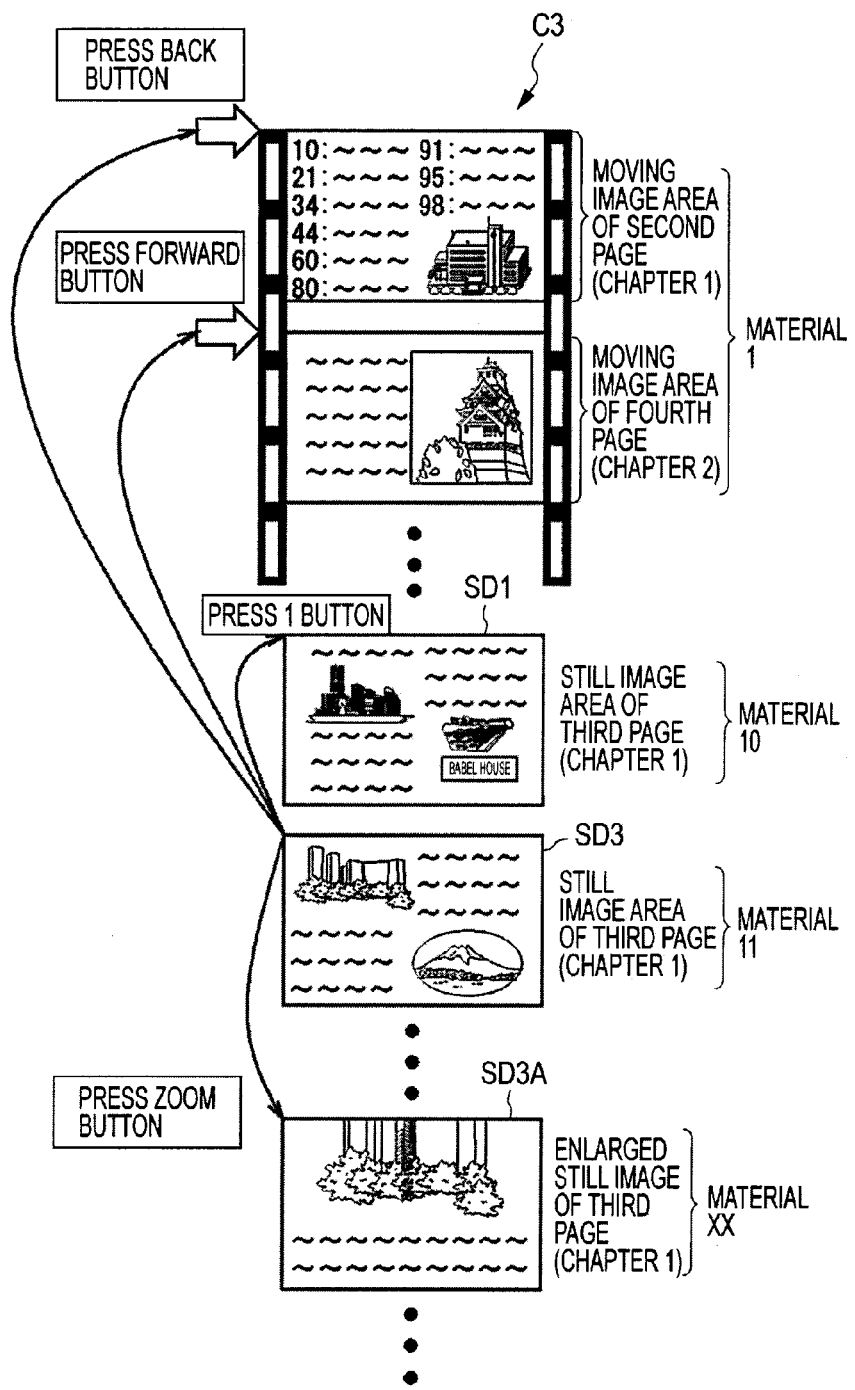
FIG. 13 is a schematic diagram illustrating an exemplary page transition in accordance with operations with a button with a third page being displayed.

Next, with reference to FIG. 13, page transition during reproduction of the Blu-ray disc 5 on which the new content data C3 including the materials 1 to 10, 11, XX and other materials is recorded will be described.

When the forward button is pressed via the remote controller while, for example, the still image (chapter 1) of the third page of the material 11 is displayed on the television receiver 103 during reproduction of the Blu-ray disc 5, the BD recorder 101 starts reproduction of the moving image at the top of the moving image area (chapter 2) of the fourth page of the material 1.

When the back button is pressed via the remote controller while the still image of the third page of the material 11 is displayed on the television receiver 103, the BD recorder 101 starts reproduction of the moving image at the top of the moving image area (chapter 1) of the second page of the material 1.

The BD recorder 101 starts reproduction of the moving image at the top of the moving image area (chapter 1) of the second page of the material 1 and the moving image area (chapter 2) of the fourth page. Since the BD recorder 101 repeatedly reproduces the 300 frames of the same content at the frame frequency of 60 Hz, although the frames are reproduced as moving images, a viewer considers the frames as a still image.

When "1" button specifying the first page is pressed via the remote controller while the still image of the third page of the material 11 is displayed on the television receiver 103, the BD recorder 101 starts reproduction of the still image at the top of the still image (chapter 1) of the first page of the material 10.

When the zoom button is pressed via the remote controller while the still image of the third page of the material 11 is displayed on the television receiver 103, the BD recorder 101 starts reproduction of the still image of the third page of the previously created material XX.

As described above, regarding the page transition of the new content data C3 in the BD recorder 101, the pages are transitioned on the basis of the page number of the original content data C1 instead of material numbers, such as the materials 1 to 10, 11, XX and other materials.

Accordingly, in the BD recorder 101, pages of the still images and the moving image areas of the content data C3 can be switched in accordance with the order of the original content data C1.

1-4. Page Transition Control Information

In such a disc manufacturing apparatus 1, it is necessary for the CPU 2A to generate page transition control information and record the same in the Blue-ray disc 5 in advance. The page transition control information is used for page transition among, for example, the chapters 1, 2 and other chapters of the material 1, the chapter 1 of the material 10, the chapter 1 of the material 11 and the chapter 1 of the material XX.

The page transition control information may include material information in the recording medium, chapter-page information provided for each material and/or link information defined for each material as will be described later.

1-4-1. Material Information

As illustrated in FIG. 14, the material information Mi in the recording medium (i.e., the Blu-ray disc 5) includes stored locations of the materials 1, XX and other materials corresponding to the material numbers thereof.

In the material information Mi, for example, the moving image data (i.e., the moving image areas of the second and fourth pages) of the material 1 (see FIG. 12) represented by the material number "1" is stored in an area represented by "/movie/001" in the Blu-ray disc 5. In the material information Mi, the moving image data (not illustrated) of the material 2 represented by the material number "2" is stored in an area represented by "/movie/002" in the Blu-ray disc 5.

As illustrated in FIG. 14, in the material information Mi, a Hyper Text Markup Language (HTML) file of, for example, the material 4 represented by the material number "4" is in a location represented by the Uniform Resource Locator (URL) of "http://www.absdbcdaed.com/Index.html" on a network. Material 4 may be known as remote content because it is stored at a location other than the recording medium. For example, remote content may be located on a local network, wide network, local network, or other media. A location of remote content may not necessarily be represented by a URL, and any other type of addressing scheme or other location information may be used.

In the material information Mi, the still image (chapter 1) of the first page of the material 10 (see FIG. 12) represented by the material number "10" is stored in an area represented by "/picture/page001" in the Blu-ray disc 5 while the still image (chapter 1) of the third page of the material 11 (see FIG. 12) represented by the material number "11" is stored in an area represented by "/picture/page003" in the Blu-ray disc 5.

In the material information Mi, the enlarged still image (chapter 1) of the third page of the material XX (see FIG. 12) represented by the material number "XX" is stored in an area represented by "/picture/page003zoom01" in the Blu-ray disc 5.

With this configuration, the BD recorder 101 which reproduces the Blu-ray disc 5 can recognize the stored locations of the materials 1, 10, 11, XX and other materials, specified by the material numbers. The BD recorder 101 then acquires moving image data and still image data of these the materials 1, 10, 11, XX and other materials, and outputs the acquired data to the television receiver 103.

1-4-2. Chapter-Page Information

As illustrated in FIG. 15, chapter-page information CPi provided for each material includes three correlated items of "chapter number," "corresponding page number," and "page top?" for the material numbers of "1" to "XX" corresponding to the material numbers of the materials 1, 10, 11, XX and other materials. As used herein, the phrase "page top" refers to whether or not an image is enlarged or zoomed-in version of another image.

Regarding the material 1 of the material number "1," the page number corresponding to "chapter number: 1" is the moving image area (chapter 1) of the second page represented by "corresponding page number: 2." The chapter is at the top of the second page represented by "page top?: true" and is thus not an enlarged still image.

Regarding the material 1 of the material number "1," the page number corresponding to "chapter number: 2" is the moving image area (chapter 2) of the second page represented by "corresponding page number: 4." The chapter is at the top of the fourth page represented by "page top?: true" and is thus not an enlarged still image.

Regarding the material 10 of the material number "10," the page number corresponding to "chapter number: 1" is the moving image area (chapter 1) of the first page represented by "corresponding page number: 1." The chapter is at the top of the first page represented by "page top?: true" and is thus not an enlarged still image.

Regarding the material 11 of the material number "11," the page number corresponding to "chapter number: 1" is the moving image area (chapter 1) of the third page represented by "corresponding page number: 3." The chapter is at the top of the third page represented by "page top?: true" and is thus not an enlarged still image.

Regarding the material XX of the material number "XX," the page number corresponding to "chapter number: 1" is the still image (chapter 1) of the third page represented by "corresponding page number: 3." The chapter is not at the top of the third page represented by "page top?: false" and is thus an enlarged still image.

In the chapter-page information CPi thus provided for each material, new chapter numbers are given on the page basis of the still image data SD1 to SD4, SD3A and other still image data constituting the original content data C1 irrespective of being the still images or the moving images. The page number corresponding to the chapter number is then determined. It is also determined whether the chapter corresponds to the top of the page.

1-4-3. Link Information

As illustrated in FIGS. 16A to 16C, link information Li defined for each material includes link source information LS corresponding to the "link number" and link destination information LG.

The link information Li includes "link number" which is uniquely assigned in the material, "chapter number" in which the link exists, "x coordinate," "y coordinate," "width" and "height" of the link, "material number of transition destination" and "page number of transition destination" at the time of selection of the link.

Regarding the material 1 of the material number "1," link source information LS1 and link destination information LG1 are correlated to each "link number." Regarding the material 10 of the material number "10," link source information LS10 and link destination information LG10 are correlated to each link number."

Similarly, regarding the material 11 of the material number "11," link source information LS11 and link destination information LG11 are correlated to each "link number: 1." Description of the material XX for the material number "XX" (see FIG. 12) is omitted for the ease of illustration.

Regarding, for example, the material 1 of the material number "1," in the "link number: 1," when an area of the second page corresponding to "chapter number: 1" represented by "x coordinate: 310," "y coordinate: 130," "width: 130" and "height: 30" is clicked as the link source information LS1, the page is linked to the "material number of transition destination: 5" and "page number of transition destination: 10" as the link destination information LG1.

Regarding the material 1 of the material number "1," in the "link number: 2," when an area of the fourth page corresponding to "chapter number: 2" represented by "x coordinate: 230," "y coordinate: 20," "width: 150" and "height: 80" is clicked as the link source information LS1, the page is linked to the "material number of transition destination: 6 of transition destination" and "page number of transition destination: 12" as the link destination information LG1.

Regarding, for example, the material 10 of the material number "10," in the "link number: 1," when an area of the first page corresponding to "chapter number: 1" represented by "x coordinate: 20," "y coordinate: 250," "width: 150" and "height: 50" is clicked as the link source information LS10, the page is linked to the "material number of transition destination: 13" and "page number of transition destination: 15" as the link destination information LG10.

Regarding the material 10 of the material number "10," in the "link number: 2," when an area of the first page corresponding to "chapter number: 1" represented by "x coordinate: 50," "y coordinate: 200," "width: 30" and "height: 20" is clicked as the link source information LS10, the page is linked to the "material number of transition destination: XX" and "page number of transition destination: 3" as the link destination information LG10.

Regarding the material 10 of the material number "10," in the "link number: 3," when an area of the first page corresponding to "chapter number: 1" represented by "x coordinate: 250," "y coordinate: 300," "width: 100" and "height: 30" is clicked as the link source information LS10, the page is linked to the "material number of transition destination: 4" and "page number of transition destination: -" as the link destination information LG10.

The page number is not shown in "page number of transition destination: -" because the material 4 represented by "material number of transition destination: 4" is a page of a site on the network.

Regarding, for example, the material 11 of the material number "11," in the "link number: 1," when an area of the first page corresponding to "chapter number: 1" represented by "x coordinate: 40," "y coordinate: 280," "width: 70" and "height: 70" is clicked as the link source information LS11, the page is linked to the "material number of transition destination: 19" and "page number of transition destination: 22" as the link destination information LG11.

Thus, in the link information Li provided for each material, the link destination in accordance with the area in the page corresponding to the chapter number is specified by the material number and the page number of transition destination.

Accordingly, since the page transition control information including the material information Mi in recording medium, the chapter-page information CPi provided for each material, and/or link information Li defined for each material is recorded on the Blu-ray disc 5, the CPU 2A can provide free page transition in the new content data C3 irrespective of being the still images or the moving image areas.

1-5. Data Recording Procedure

Figure 17:
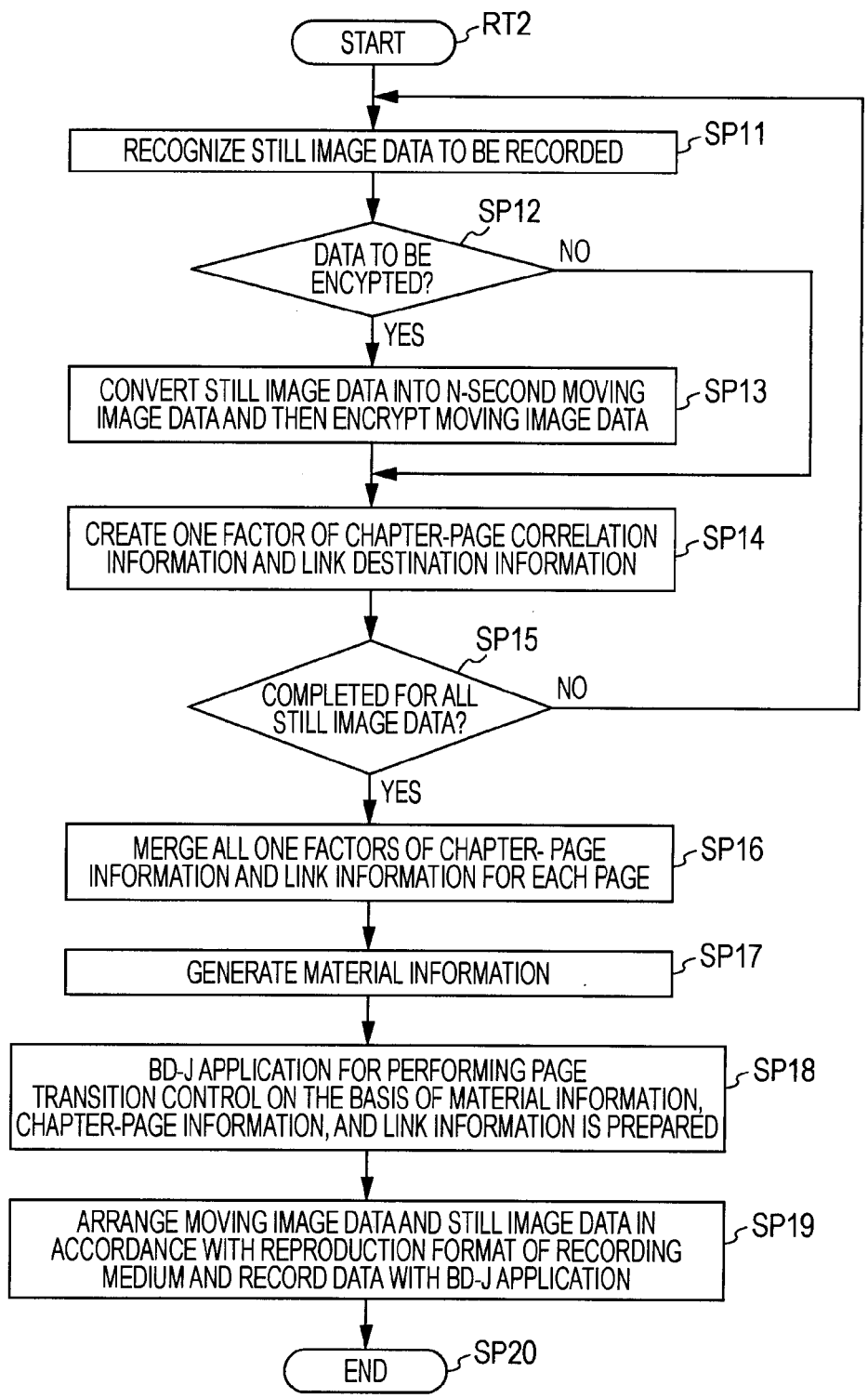
FIG. 17 is a flowchart illustrating selection on encryption and a data recording procedure.

Next, with reference to the flowchart of FIG. 17, a data recording procedure in the disc manufacturing apparatus 1 will be described. In the procedure, after the CPU 2A converts the original content data C1 into the new content data C3, the converted data is recorded on the Blu-ray disc 5 to produce a commercially-supplied disc.

The routine RT2 starts at a start step and proceeds to the next step SP11. In step SP11, a plurality of pieces of the still image data SD1 to SD4, SD3A and other still image data which constitute the content data C1 to be recorded on the Blu-ray disc 5, are recognized sequentially. The routine proceeds to the next step SP12.

In step SP12, the CPU 2A determines whether the still image data SD is data to be encrypted. If the result is negative, i.e., if no direction has been given regarding encryption of the still image data SD because the content creator recognizes that copy-protection of the data is unnecessary, the routine proceeds to the next step SP14.

If, on the other hand, the result is affirmative at step SP12, i.e., a direction for encryption of the still image data SD has been given because the content creator recognizes that copy-protection of the data is necessary, the routine proceeds to the next step SP13.

Figure 18:
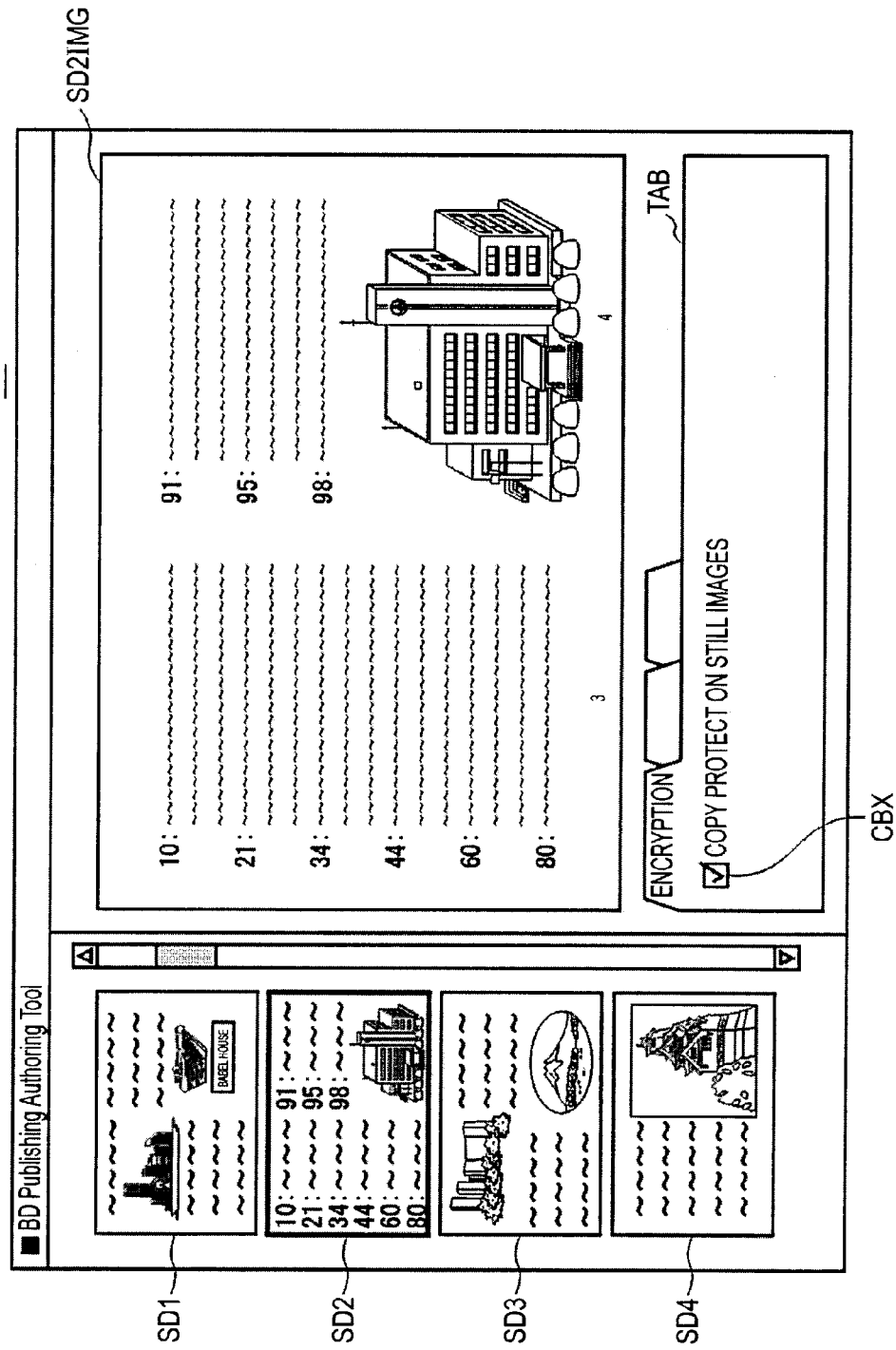
FIG. 18 is a schematic diagram illustrating a screen for selection of data to be encrypted.

The CPU 2A displays a screen G1 for selection of data to be encrypted as illustrated in FIG. 18 on the monitor 10 in accordance with a predetermined authoring software. On the screen G1, the content creator is asked to select piece(s) of the still image data SD to be set as data to be encrypted.

In the screen G1, the still image data SD1 to SD4 and other still image data to be recorded is displayed adjacent to one another. Among the displayed pieces of still image data, a frame of, for example, the currently selected still image data SD2 of the second page is highlighted and the display image SD2IMG of the still image data SD2 is displayed in a predetermined size.

In the screen G1, a tab TAB for selecting whether the still image data SD2 is encrypted is provided under the display image SD2IMG and a check mark is given in a check box CBX.

With this configuration, the content creator can set the still image data SD2 as data to be encrypted by giving a check mark to the check box in the tab TAB via the display image SD2IMG of the screen G1 when copy-protection of the still image data SD2 is considered to be necessary.

In step SP13, if the still image data SD recognized in step SP11 has been set as data to be encrypted on the screen G1, the CPU 2A encrypts, after the conversion of the still image data SD into n-second moving image data, the data in accordance with a predetermined encryption system. The routine proceeds to the next step SP14.

In step SP14, irrespective of being the data to be encrypted, the CPU 2A generates one factor of the chapter-page information CPi and the link information Li for each page corresponding to the chapter number on the basis of still image data SD which constitutes content data C1. As used herein, the term "factor" broadly refers to a portion, instance, piece, table, or object of data. The routine proceeds to the next step SP15.

In step SP15, the CPU 2A determines, for all pieces of the still image data SD which constitute the content data C1, that the one factor of the chapter-page information CPi and the link information Li have been generated on the page basis corresponding to the chapter number.

If the result is negative, i.e., the one factor of the chapter-page information CPi and the link information Li have not been generated on the page basis corresponding to the chapter number for all pieces of the still image data SD which constitute content data C1, the routine loops back to step SP11 and repeats the process described above.

If, on the other hand, the result is affirmative in step SP15, i.e., the one factor of the chapter-page information CPi and the link information Li have been generated on the page basis corresponding to the chapter number for all pieces of the still image data SD which constitute content data C1, the routine proceeds to the next step SP16.

In step SP16, the CPU 2A merges all of the one factors of the chapter-page information CPi generated on the page basis corresponding to the chapter number for each piece of the still image data SD and merges all of the one factors of the link information Li generated on the page basis corresponding to the chapter number for each piece of the still image data SD. Thus, the chapter-page information CPi and the link information Li are generated and the routine proceeds to the next step SP17.

In step SP17, regarding all of the pieces of the still image data SD which constitute the content data C1, the data to be encrypted is converted into the moving image data and the content not to be encrypted is chaptered as the still image data SD. Thus, the materials 1, 10, 11, XX and other materials are generated. Accordingly, the CPU 2A generates the material information Mi (see FIG. 14) in which the material numbers described above and the stored location thereof are correlated to each other and the routine proceeds to the next step SP18.

In step SP18, the CPU 2A prepares the BD-J application programmed to execute page transition control in accordance with the page transition control information including the material information Mi, the chapter-page information CPi and/or the link information Li. The routine proceeds to the next step SP19.

In step SP19, the CPU 2A disposes the moving image data of the material 1 and the still image data SD of the materials 10, 11, XX and other materials in accordance with a format of the Blu-ray disc 5 and records the moving image data and the still image data SD together with the BD-J application and the page transition control information on the Blu-ray disc 5. The routine proceeds to step SP20 where the process ends.

In this manner, the CPU 2A can record the new content data C3 including the material 1, the material 10, the materials 1, 10, 11, XX and other materials generated by chaptering all of the moving image data and the still image data SD on the Blu-ray disc 5 so that page transition can be controlled by the BD recorder 101 which reproduces the Blu-ray disc 5.

1-6. Exemplary Data Storage of Recording Medium

Figure 19:
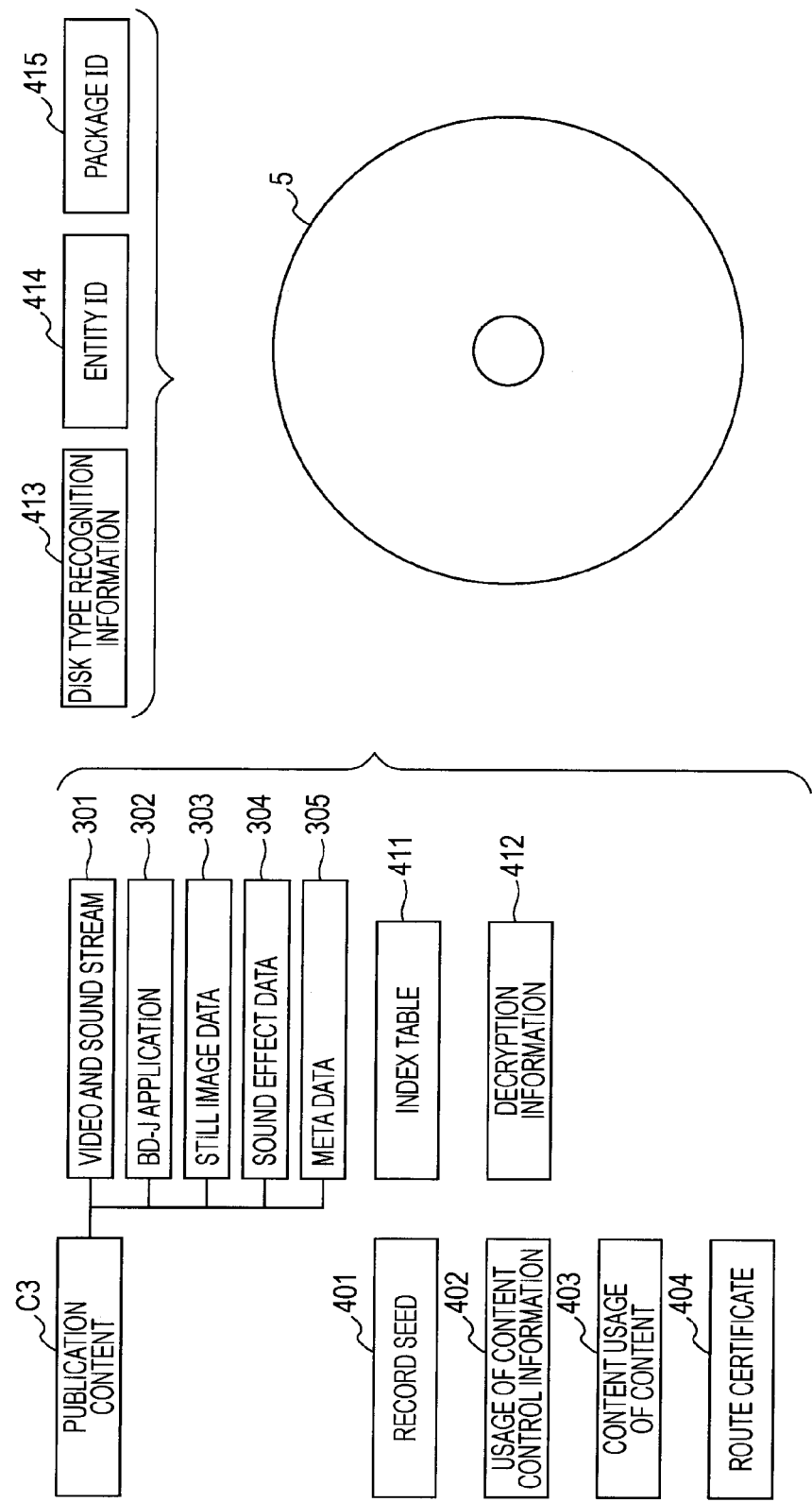
FIG. 19 is a schematic diagram illustrating exemplary data storage in a recording medium.

Referring now to FIG. 19, exemplary data storage of the Blu-ray disc 5 manufactured as a commercially-supplied disc will be described.

The new content data C3 converted from the original content data C1 is stored in the Blu-ray disc 5.

The new content data C3 includes a video and sound stream 301, a BD-J application 302, still image data 303, sound effect data 304 and meta data 305. The video and sound stream 301 includes encrypted moving image data which has new content data C3 and audio data corresponding to the same. The BD-J application 302 operates during reproduction of the Blu-ray disc 5. The still image data 303, such as still image SD1, SD3 and SD3A of which page transition is controlled by the BD-J application 302. The encrypted moving image data and the still image data 303 may be stored as part of one or more data structures, such as a content data structure. Generally, a data structure may include multiple other data structures. The sound effect data 304 used for outputting predetermined sound effects on the screen displayed by the BD-J application 302. The meta data 305 includes the above-described page transition control information as well as various pieces of information, such as price of the disc. The page transition control information may be stored as part of one or more data structures, such as a control data structure.

The Blu-ray disc 5 also has record seed 401 and usage of content control information 402 recorded thereon. The record seed 401 is used for generating decryption key data necessary for decipherment of the encrypted moving image data of the video and sound stream 301. The usage of content control information 402 includes copy limit information, reproduction control information and other information corresponding to the new content data C3.

The Blu-ray disc 5 also has a content certificate 403 and a route certificate 404. The content certificate 403 includes a hash value for verifying the new content data C3, a hash value of route certificate 404 and other data. The route certificate 404 which is a public key certification is issued by a third party.

The Blu-ray disc 5 also has an index table 411 and decryption information 412 recorded thereon. The index table 411 defines, for example, a reproduction sequence of the new content data C3. The decryption information 412 is necessary for decryption of the video and sound stream 301 at the reproduction side.

The Blu-ray disc 5 also has disc type identification information 413, entity identification (ID) 414 and a package ID 415. The disc type identification information 413 is used to determine disc type. The entity ID 414 represents an entity which generated the new content data C3 in order to identify the Blu-ray disc 5. The Package ID 415 is used to identify a production package.

1-7. Overall Structure of BD Reproduction System

Next, an overall structure of the BD reproduction system which reproduces a commercially-supplied disc, i.e., the Blu-ray disc 5, will be described with reference to FIG. 20.

Figure 20:
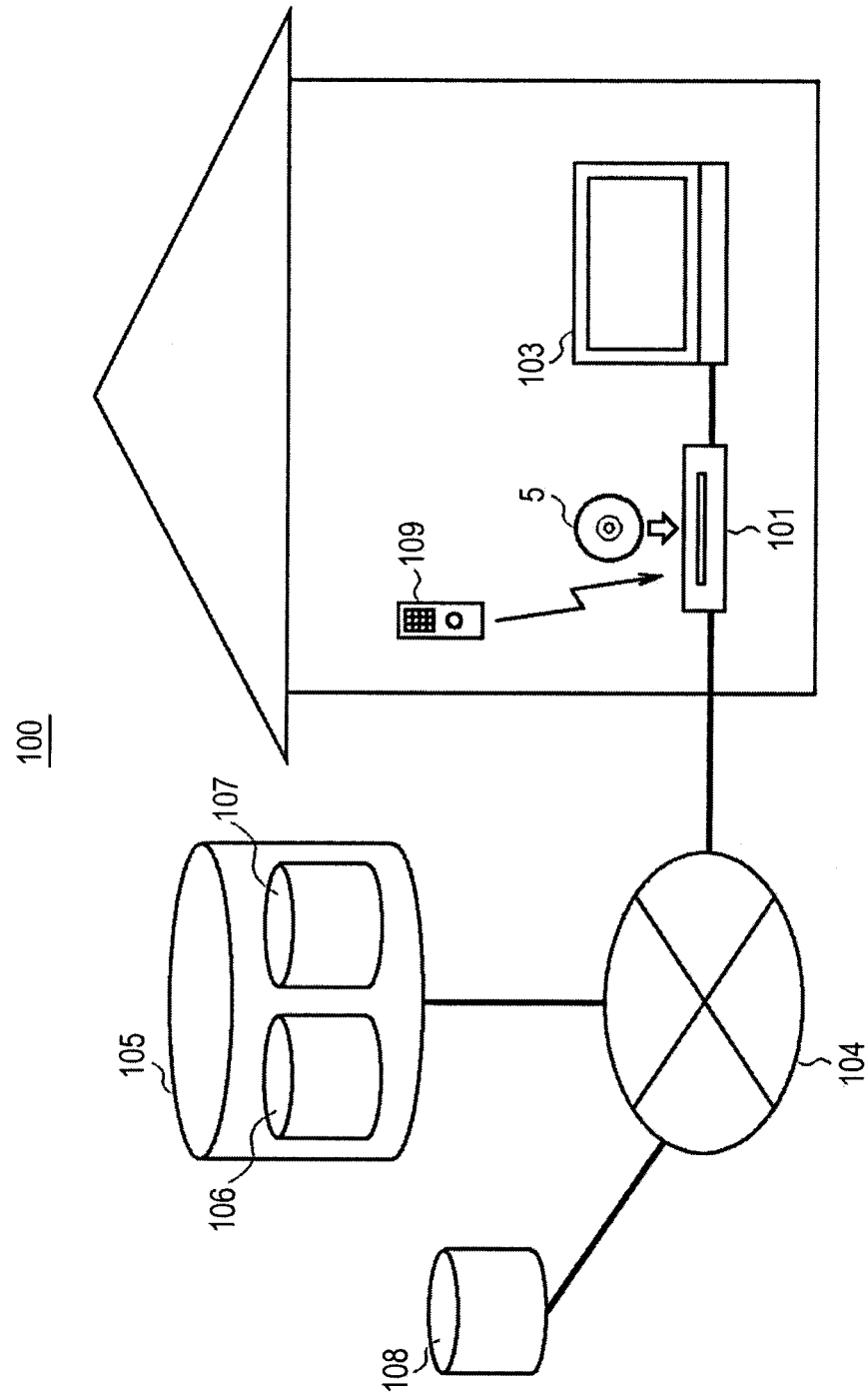
FIG. 20 is a schematic diagram illustrating an overall structure of a BD reproduction system.

An overall Blu-ray (BD) reproduction system is denoted by a reference numeral 100 in FIG. 20. When the Blu-ray disc 5 is reproduced by the BD recorder 101 in a home, the reproduction result is displayed on, for example, the television receiver 103 connected via a High Definition Multimedia Interface (HDMI) cable.

A user can enjoy online shopping with the BD recorder 101 by communicating with a download server 105 on the network 104 using the BD-J application 302 (see FIG. 19) recorded on the Blu-ray disc 5.

The download server 105 has content database (hereinafter, "content DB") 106 which holds information on the content data C1 (e.g., videos, photographs, price and stock quantity) and customer database (hereinafter, "customer DB") 107 which holds customer information (e.g., names, addresses and credit card information).

When the content data C1 is downloaded, the BD recorder 101 executes settlement processing via a settlement server 108 shared with other online shopping companies on the network 104.

The BD recorder 101 controls reproduction of the Blu-ray disc 5 and controls the GUI provided by the BD-J application 302 via a remote controller 109.

1-7-1. Hardware Circuit Configuration of BD Recorder

Figure 21:
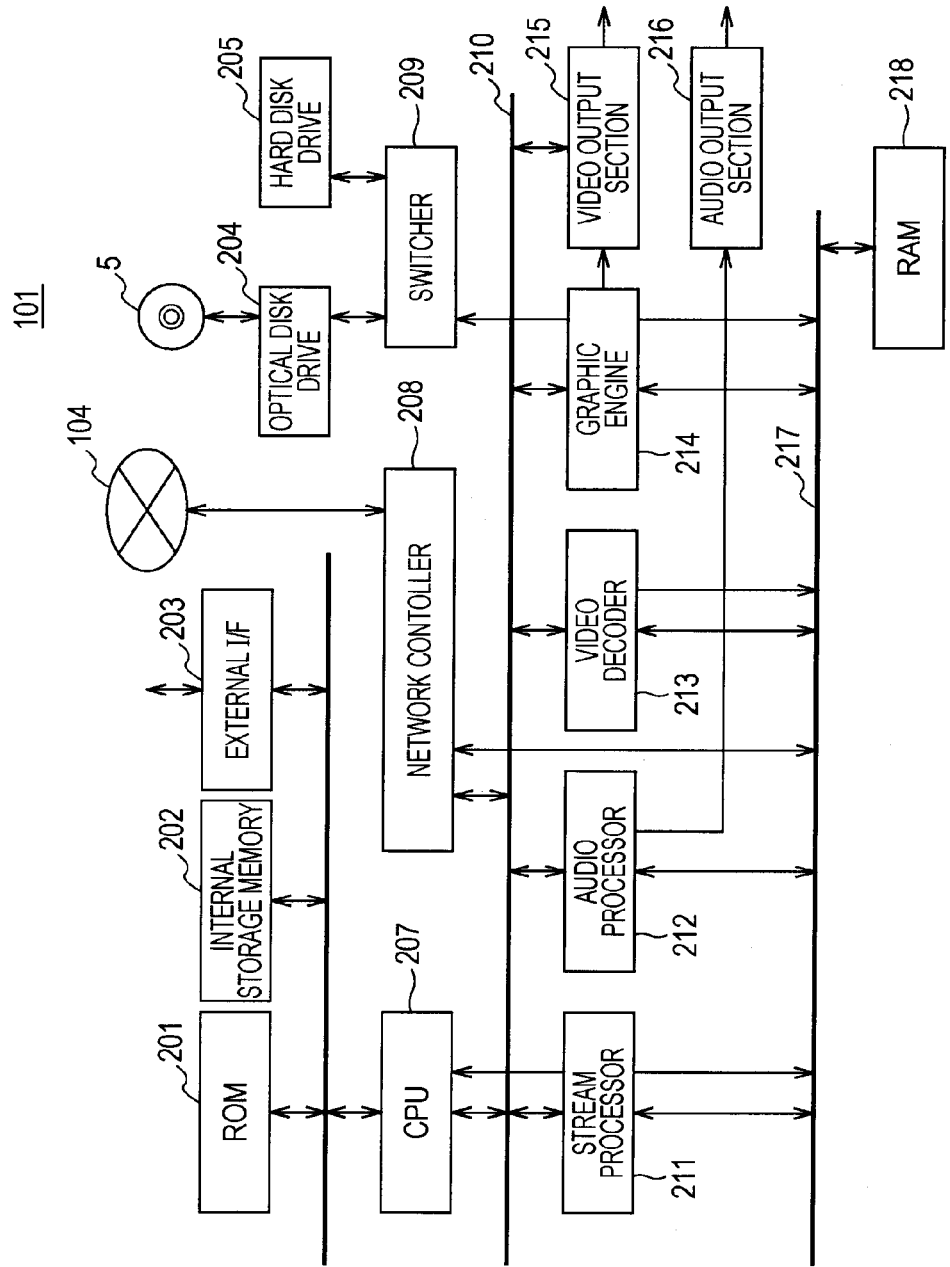
FIG. 21 is a schematic block diagram illustrating a circuit configuration of a BD recorder.

As illustrated in FIG. 21, in the BD recorder 101, the CPU 207 starts, on the RAM 218, the base program stored in the ROM 201 and various application programs stored in the hard disk drive 205, and controls the components of the BD recorder 101 in accordance with the base program and the various application programs so as to execute a recording and reproducing process and other processes.

In practice, when the Blu-ray disc 5 is inserted in the optical disk drive 204, the CPU 207 of BD recorder 101 reads the video and sound stream 301, the BD-J application 302, the still image data 303, the sound effect data 304 and the meta data 305 recorded on the Blu-ray disc 5 via a switcher 209.

The CPU 207 transmits the video and sound stream 301 to a stream processor 211 via a memory bus 217. The video and sound stream 301 is subject to decipherment or other processes in the stream processor 211. The CPU 207 sends the deciphered moving image data to a video decoder 213 and audio data to an audio processor 212.

The video decoder 213 displays, on the television receiver 103, the reproduced image obtained through decoding of the moving image data via a graphic engine 214 and a video output section 215.

The audio processor 212 outputs the reproduced audio obtained through decoding of the audio data from the speaker of the television receiver 103 via an audio output section 216.

When various pieces of content are downloaded from sites on the network 104 using the BD-J application 302 recorded on the Blu-ray disc 5, the CPU 207 can store the downloaded content in, for example, a built-in storage memory 202 including the semiconductor memory or other memory, or a universal serial bus (USB) memory (not illustrated) connected via an external interface 203.

When data volume of the content is large, the CPU 207 may store the content in the hard disk drive 205 via the switcher 209 instead of the in the built-in storage memory 202 or in the USB memory.

1-7-2. Software Configuration of BD Recorder

Figure 22:
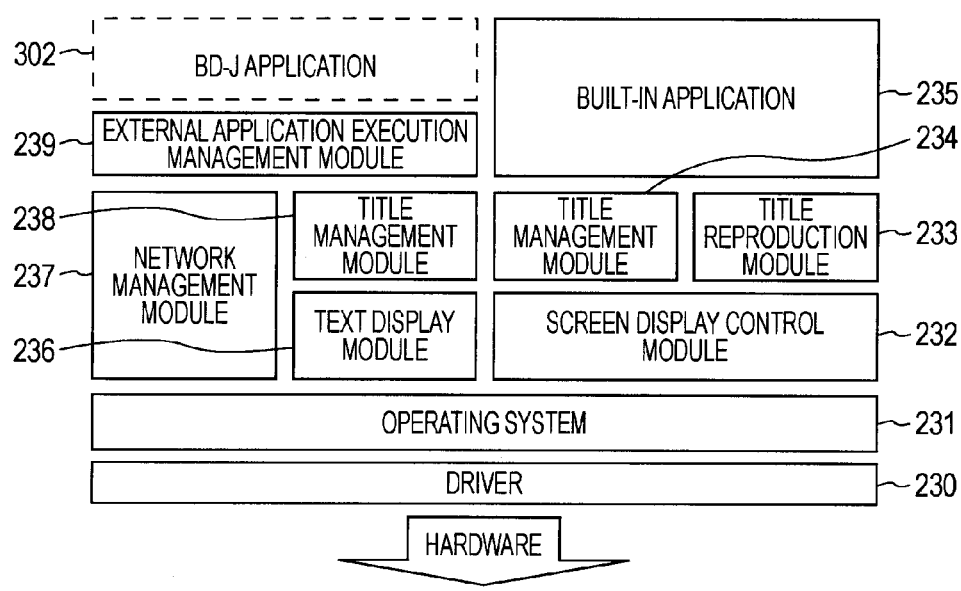
FIG. 22 is a schematic diagram illustrating a software configuration of the BD recorder.

Next, a software configuration which the CPU 207 implements in accordance with the application program will be described with reference to in FIG. 22.

In practice, the operating system 231 inputs/outputs data to and from the hardware of the BD recorder 101 via the driver 230 and manages the resource of an upper program.

When the screen display control module 232, which precedes to the operating system 231, displays titles and text in accordance with a drawing request after an image to be completed is determined.

The title reproduction module 233, which precedes to the screen display control module 232, manages control during reproduction of the title of GUI provided by the built-in application 235. The text display module 234 manages control on directions of drawing text from the built-in application 235.

The network management module 237, which precedes to the operating system 231, controls accesses to the download server 105 and to the settlement server 108 on the network 104.

The title management module 238 manages titles of files through operation of the files existing on the operating system 231 via the file management module 236.

The BD-J application 302, corresponding to an external application read from the Blu-ray disc 5, interacts with a body program of the BD recorder 101 via, for example, an external application execution management module 239 corresponding to Virtual Machine of Java (registered trademark).

1-8. Reproduction

Figure 23:
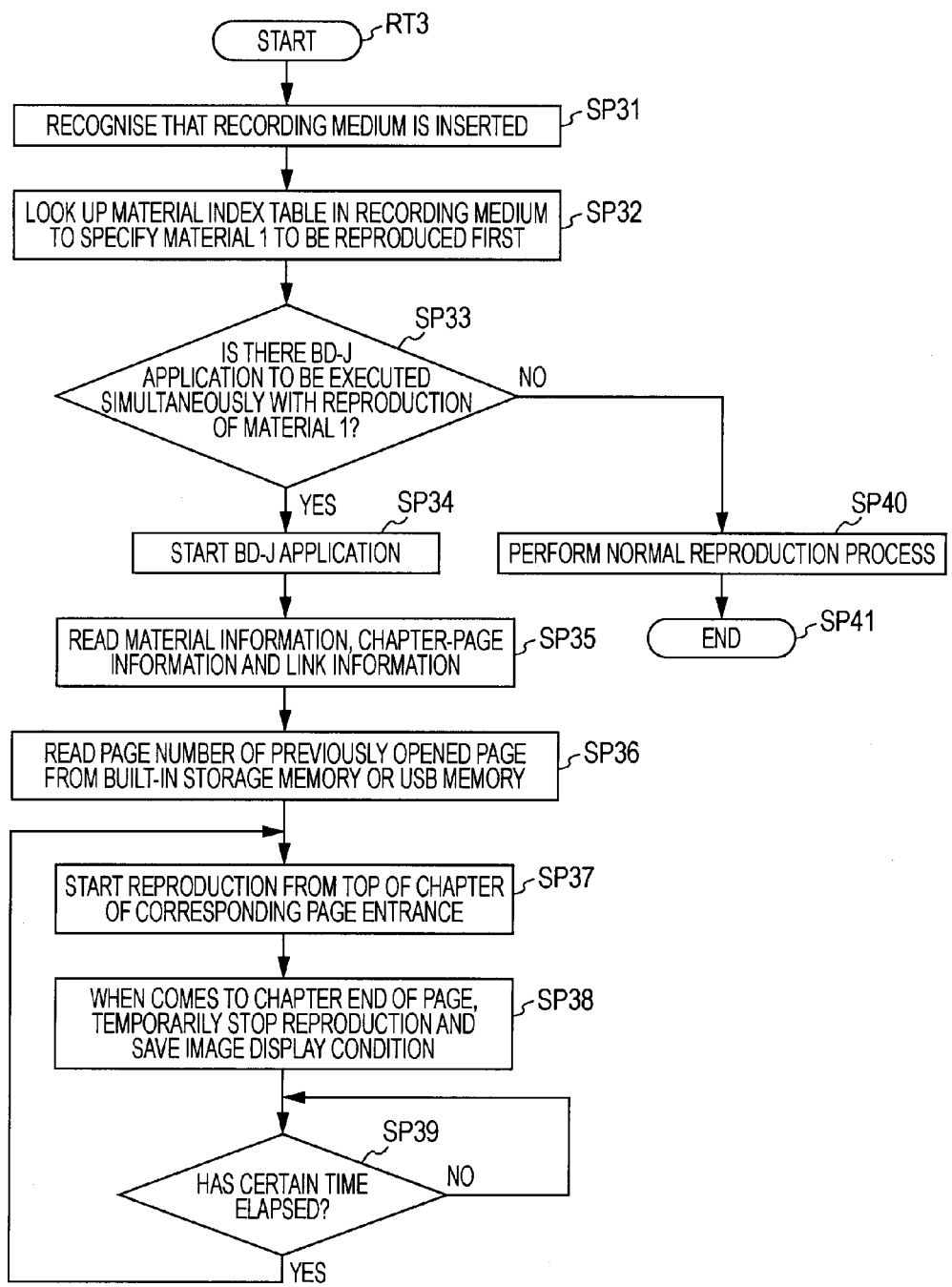
FIG. 23 is a flowchart illustrating a reproduction procedure.

Next, a procedure in which the BD recorder 101 reproduces the Blu-ray disc 5 will be described with reference to a flowchart in FIG. 23.

A routine RT3 starts at a start step and proceeds to the next step SP31. In step SP31, it is determined that a recording medium, i.e., the Blu-ray disc 5, has been inserted in the optical disk drive 204. The routine proceeds to the next step SP32.

In step SP32, the CPU 207 refers to the index table 411 (see FIG. 19) recorded on the Blu-ray disc 5 and specifies a material 1 (see FIG. 12) to be reproduced first. The routine proceeds to the next step SP33.

In step SP33, the CPU 207 determines whether the BD-J application 302 to be executed simultaneously with reproduction of the material 1 exists on the Blu-ray disc 5.

If the result is negative, i.e., the BD-J application 302 to be executed simultaneously with the material 1 does not exist on the Blu-ray disc 5 and thus it is only necessary to reproduce the material 1 in an ordinary manner, the routine proceeds to the next step SP40 where the material 1 is reproduced in an ordinary manner. The routine proceeds to step SP41 where the process ends.

If, on the other hand, the result in step SP33 is affirmative, i.e., if the BD-J application 302 to be executed simultaneously with the reproduction of the material 1 exists on the Blu-ray disc 5, the routine proceeds to the next step SP34.

In step SP34, the CPU 207 starts the BD-J application 302 previously recorded on the Blu-ray disc 5 and the routine proceeds to the next step SP35.

In step SP35, the CPU 207 reads material information Mi, chapter-page information CPi and link information Li recorded on the Blu-ray disc 5. The routine proceeds to the next step SP36.

In step SP36, the CPU 207 reads the page number of a previously opened page from the USB memory (not illustrated) or the built-in storage memory 202 (see FIG. 21) connected via the external interface 203. The routine proceeds to the next step SP37.

In step SP37, the CPU 207 starts reproduction at the top of the chapter of the page corresponding to the page number read in step SP36. The routine proceeds to the next step SP38.

In step SP38, the CPU 207 continues reproduction until the last of the chapter of the page, where the reproduction is temporarily stopped. The display condition of the last frame image (the first frame image when the data to be reproduced is still images) is retained. The routine proceeds to the next step SP39.

In step SP39, the CPU 207 determines whether a predetermined time period (e.g., 10 seconds) has elapsed after the display condition with respect to the last frame image is retained. If the result is negative, i.e., if the predetermined time period has not yet elapsed, the CPU 207 stands by until the predetermined time period elapses.

If, on the other hand, the result is affirmative in step SP39, i.e., the predetermined time period has already elapsed with the display condition of step SP38 being retained, the routine proceeds to CPU 207.

In step SP37, since the predetermined time period has elapsed, the CPU 207 finds the next page on the basis of page transition control information, as in the case where the "next" direction is given, and the reproduction is started at the top of the chapter of the following page and subsequent processes are repeated.

1-9. Reproduction in Accordance with Button Operation

Figure 24:
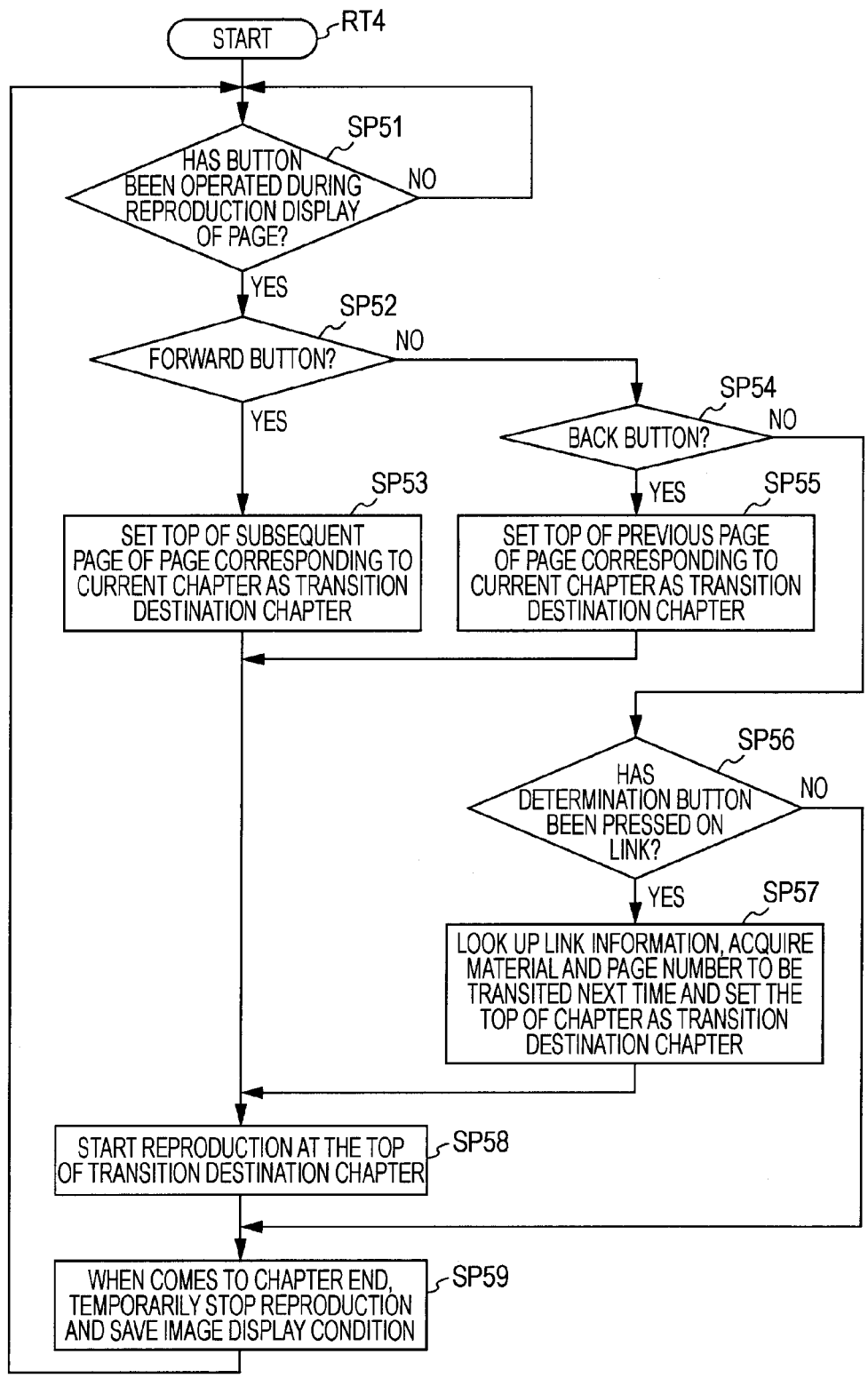
FIG. 24 is a flowchart illustrating a reproduction procedure in accordance with operation with a button.

Next, a procedure in which the BD recorder 101 reproduces the Blu-ray disc 5 in accordance with user operations with a button will be described with reference to a flowchart of FIG. 24.

The routine RT4 starts at a start step and proceeds to the next step SP51, where the CPU 207 determines whether a certain button has been pressed during reproduction of a page.

If the result is negative, i.e., if no button has been pressed during reproduction of the page, the CPU 207 stands by until a certain button is pressed.

If, on the other hand, the result is affirmative in step SP51, i.e., a certain button has been pressed during reproduction of the page, the routine proceeds to the next step SP52.

In step SP52, the CPU 207 determines whether the pressed button is the forward button. If the result is affirmative, the routine proceeds to the next step SP53.

In step SP53, the CPU 207 sets, in accordance with the chapter-page information CPi (FIG. 15) of the page transition control information, the chapter number of the material number corresponding to the subsequent page number as a transition destination chapter on the basis of page number corresponding to the current chapter. The routine proceeds to the next step SP58.

If, for example, a page number corresponding to the current chapter is the third page, the CPU 207 refers to the chapter-page information CPi and recognizes that the chapter 2 of the chapter number "2" of the material 1 of which the subsequent corresponding page number is the fourth page is a transition destination chapter. Then, the CPU 207 sets the chapter 2 of the material 1 as a transition destination chapter.

In step SP58, the CPU 207 starts reproduction at the top of the transition destination chapter and the routine proceeds to the next step SP59. If the transition destination chapter is the chapter 2 of the material 1 constituting of the moving image area, the CPU 207 starts reproduction of the moving image from the head. However, if the transition destination chapter is the chapter 1 of the material XX which is the still image data, the CPU 207 reproduces the still images with respect to the still image data SD3A.

In step SP59, the CPU 207 continues reproduction until the last of the chapter of the page which is currently reproduced, where the reproduction is temporarily stopped. The display condition of the last frame image is retained and the routine loops back to step SP51.

If the transition destination chapter is the chapter 2 of the material 1 which constitutes the moving image area, the CPU 207 retains the display condition with respect to the last frame image. However, if the transition destination chapter is the chapter 1 of the material XX which is the still image data, the display condition of the still image reproduction with respect to the still image data SD3A is retained.

If, on the other hand, the result is negative at step SP52, i.e., if the pressed button is not the forward button, the routine proceeds to the next step SP54.

In step SP54, the CPU 207 determines whether the pressed button is the back button. If the result is affirmative, the routine proceeds to the next step SP55.

In step SP55, the CPU 207 sets, in accordance with the page transition control information in the chapter-page information CPi (see FIG. 15), a chapter number of a material number corresponding to the previous corresponding page number as a transition destination chapter on the basis of the page number corresponding to the current chapter. The routine proceeds to the next step SP58.

If, for example, a page number corresponding to the current chapter is the third page, the CPU 207 refers to the chapter-page information CPi and recognizes that the chapter 1 of the chapter number "1" of the material 1 of which the previous corresponding page number is the second page is a transition destination chapter. Then, the CPU 207 sets the chapter 1 of the material 1 as a transition destination chapter.

In step SP58, the CPU 207 starts reproduction at the top of the transition destination chapter, and the routine proceeds to the next step SP59. In step SP59, the CPU 207 continues reproduction until the last of the chapter of the page which is currently reproduced, where the reproduction is temporarily stopped. The display condition of the last frame image is retained and the routine loops back to step SP51.

If, on the other hand, the result is negative at step SP54, i.e., if the pressed button is neither the forward button nor the back button, the routine proceeds to the next step SP56.

In step SP56, the CPU 207 determines whether the determination button is pressed while the cursor is placed on the link provided on the page corresponding to the current chapter.

If the result is negative, i.e., if the pressed button is not the forward button, the back button nor the determination button, the routine proceeds to the next step SP59.

In step SP59, since no direction is given to the transition of the pages, the CPU 207 continues reproduction until the last of the chapter of the page which is currently reproduced, where the reproduction is temporarily stopped. The display condition of the last frame image is retained and the routine loops back to step SP51.

If, the result is affirmative in step SP56, i.e., if the determination button is pressed on the link provided on the page corresponding to the current chapter, the routine proceeds to the next step SP57.

In step SP57, the CPU 207 refers to link information Li (see FIG. 16) of the page transition control information to acquire the material number of the transition destination and the page number of the transition destination. The CPU 207 then sets a top the page as the transition destination chapter. The routine proceeds to the next step SP58.

In step SP58, the CPU 207 starts reproduction at the top of the transition destination chapter, and the routine proceeds to the next step SP59. In step SP59, the CPU 207 continues reproduction until the last of the chapter of the page which is currently reproduced, where the reproduction is temporarily stopped. The display condition of the last frame image is retained and the routine loops back to step SP51.

1-10. Operation and Effects

With the configuration described above, the control section 2 of the disc manufacturing apparatus 1 selects, among the still image data SD1 to SD4, the enlarged still image data SD3A and other still image data of the content data C1, only the still image data SD2 and SD4 to be copy-protected in accordance with a direction of the content creator, converts the selected still image data into moving image data and then encrypts the same.

The control section 2 can record the moving image area generated on the basis of the still image data SD2 and SD4 and the still image areas, such as other still image data SD1, SD3 and SD3A, in a mixed state on the Blu-ray disc 5 together with the BD-J application 302.

The control section 2 can record only the still image data SD2 and SD4 to be copy-protected which has been converted into moving images and then encrypted. Thus, as compared with a case where all the still image data SD1 to SD4, the enlarged still image data SD3A and other still image data are converted into moving images and then encrypted, security can be enhanced with respect to the still image data to be copy-protected SD2 and SD4 while avoiding an increase in data volume.

The control section 2 generates page transition control information (the material information Mi, the chapter-page information CPi and/or link information Li) for free transition among the chapters 1 and 2 of material 1, the chapter 1 of the material 10, the chapter 1 of the material 11, the chapter 1 of the material XX, and other chapters of other materials of new content data C3 that have been generated through conversion into moving images. The page transition control information is recorded on the Blu-ray disc 5.

With this configuration, in the BD recorder 101, during reproduction of the Blu-ray disc 5, when the forward button is pressed while the still image (chapter 1) of the third page in the material 11 is displayed, the page can be transitioned to the moving image area (chapter 2) of the fourth page in the material 1 in accordance with the page transition control information.

Similarly, in the BD recorder 101, when the back button is pressed while the still image (chapter 1) of the third page in the material 11 is displayed, the page can be transitioned to the moving image area (chapter 1) of the second page in the material 1 in accordance with the page transition control information.

As described above, in the BD recorder 101, if the page is transitioned in the new content data C3, the pages are transitioned in accordance with the page transition control information irrespective of the material number on the basis of the page number of the original content data C1. Thus, pages can be transitioned without causing the user to feel awkward.

In the BD recorder 101, the user may leave the content data C3 and access a linked content DB 106 of the download server 105 on the network 14 to transition to other information in accordance with the page transition control information.

With the configuration described above, when data of the content of the printed matters, such as magazines, newspapers, photograph collections and catalogs, is converted into the BD-ROM format and recorded on the Blu-ray disc 5, the control section 2 can convert only the still image data SD2 and SD4 to be copy-protected in accordance with a direction of the content creator into moving images.

In practice, if all the pieces of the still image data SD are converted into moving images and encrypted in the control section 2, data volume is increased. It is thus not possible to record the entire data on the Blu-ray disc 5. Even if the entire data can be recorded on the Blu-ray disc 5, downloading through the network 104 may take significant time.

However, in the control section 2, since only the still image data SD2 and SD4 which are to be copy-protected is converted into moving images and encrypted, data volume of the content data C3 to be recorded on the Blu-ray disc 5 can be reduced significantly.

In the BD recorder 101, when the Blu-ray disc 5 on which the new content data C3 and the page transition control information are recorded is reproduced, the pages can be transitioned in accordance with the page numbers of the original content data C1 although the material 1 and other materials of the moving image area and material 10, 11, XX and other materials of the still image area are mixed together.

In the BD recorder 101, the user may access the linked content DB 106 of the download server 105 on the network 14 from a page of the publication content C3 recorded on the Blu-ray disc 5 and may be transitioned to other information in accordance with the page transition control information of the Blu-ray disc 5.

2. Other Embodiments

In the foregoing embodiment, the still image data SD2 and SD4 is converted into moving image data of 60-Hz frame frequency. However, the invention is not limited to the same and the still image data can be converted into moving image data of various frame frequency, such as 24 Hz and 30 Hz.

In the foregoing embodiment, after the conversion of the still image data SD2 and SD4 into the moving image data, the converted moving data is encrypted by AACS. However, the invention is not limited to the same and other encryption systems, such as Security Architecture For Intelligent Attachment device (SAFIA), may also be employed.

In the foregoing embodiment, the still image data SD2 and SD4 is converted into 5-second moving image data. However, the invention is not limited to the same. If the content of the still image data SD2 and SD4 is, for example, text, the data can be converted into 10-second moving image data. If the content of the still image data SD2 and SD4 is, for example, photograph, which can be recognized at a glance, the data can be converted into 3-second moving image data.

In the foregoing embodiment, the BD recorder 101 continues reproduction until the last of the chapter of the currently reproduced pate, where the reproduction is temporarily stopped. The display condition of the last frame image is retained. However, the invention is not limited to the same and reproduction may be started with respect to the next page automatically without retaining the display condition for the last frame image.

In the foregoing embodiment, the new content data C3 generated through conversion of the content data C1 is recorded on the Blu-ray disc 5. However, the invention is not limited to the same and the new content data C3 generated through conversion of the content data C1 can be recorded on other disc-shaped recording media, such as a DVD.

In the foregoing embodiment, the reproduction apparatus of the recording medium according to the invention is applied to the BD recorder 101. However, the invention is not limited to the same and can be applied to various electronic devices that can reproduce disc-shaped recording media, such as the Blu-ray disc 5. Examples of the electronic devices include a television receiver which can reproduce disc-shaped recording media, a portable disc-shaped recording medium reproduction display device, a desktop/notebook personal computer which can reproduce disc-shaped recording media and a game machine which can reproduce disc-shaped recording media.

In the foregoing embodiment, the BD recorder 101 as the reproduction apparatus of the recording medium according to the invention includes a reproduction means, such as the CPU 207, the stream processor 211, the video decoder 213, the graphic engine 214 and the optical disk drive 204, and a transition control means, such as the CPU 207, the RAM 218 and the graphic engine 214. However, the invention is not limited to the same and the reproduction apparatus of the recording medium according to the invention may include various reproduction means and transition control means.

The present application contains subject matter related to that disclosed in Japanese Priority Patent Application JP 2009-179241 filed in the Japan Patent Office on Jul. 31, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A method for generating data for a recording medium, the method comprising:
  receiving original content data representing a plurality of still images;

identifying a first subset of the still images to be recorded with copy-protection and a second subset of the still images to be recorded without copy-protection;

converting data representing the first subset into moving image data;

copy-protecting the moving image data; and generating new content data, the new content data including the copy-protected moving image data and data representing the second subset.

2. The method of claim 1, further comprising:

storing the new content data on the recording medium.

3. The method of claim 2, wherein storing the new content data comprises storing the new content data in accordance with a format providing copy-protection of moving image data and not providing copy-protection for still image data.

4. The method of claim 3, wherein the format is a Blu-ray format.

5. The method of claim 1, wherein the step of identifying further comprises:

receiving a user selection; and identifying the first subset and the second subset by the user selection.

6. The method of claim 1, wherein the step of copy-protecting further comprises encrypting the moving image data to provide copy-protection.

7. The method of claim 1, wherein:

the new content data represents a sequence of pages; and the method further comprises creating page transition control information of the new content data for transitioning between the pages, the page transition control information comprising link information.

8. The method of claim 7, wherein:

at least one of the pages includes a link, the link specifying remote content stored at a location other than the recording medium; and the method further comprises storing an application program on the recording medium, the application program configured to access the remote content in response to a selection of the link, according to the link information.

9. The method of claim 7, wherein the page transition control information further comprises at least one of chapter-page information or material information.

10. The method of claim 1, wherein the moving image data for a page comprises a plurality of frames of the same content sequentially displayed at a predetermined frequency.

11. The method of claim 1, wherein at least one of the still images of the original content data corresponds to an enlarged zoomed-in portion of another of the still images.

12. A non-transitory data storage medium for a playback apparatus, comprising:

a content data structure comprising a plurality of still images, the still images representing related pages, the still images comprising:

a first subset stored as copy-protected moving image data; and a second subset stored as non-copy-protected still image data; and a control data structure which, when accessed by the playback apparatus, causes the content data structure to be output in a sequence of the pages determined by the playback apparatus.

13. The non-transitory data storage medium of claim 12, wherein the content data is stored according to a format providing copy-protection of moving image data and not providing copy-protection for still image data.

14. The non-transitory data storage medium of claim 13, wherein the format is a Blu-ray format.

15. The non-transitory data storage medium of claim 12, wherein the copy-protected moving image data is stored in an encrypted format.

16. The non-transitory data storage medium of claim 12, wherein the control data structure comprises page transition control information for transitioning between the pages, the page transition control information comprising link information.

17. The non-transitory data storage medium of claim 16, wherein at least one of the pages includes a link, the link specifying remote content stored at a location other than the data storage medium, and wherein the data storage medium further comprises:

an application program, which, when executed by a processor, causes the processor to access the remote content in response to a selection of the link, according to the link information.

18. The non-transitory data storage medium of claim 16, wherein the page transition control information further comprises at least one of chapter-page information or material information.

19. The non-transitory data storage medium of claim 12, wherein the moving image data for a page comprises a plurality of frames of the same content for sequential display at a predetermined frequency.

20. The non-transitory data storage medium of claim 12, wherein at least one of the still images corresponds to an enlarged zoomed-in portion of another of the still images.

21. A playback apparatus, comprising:

a drive configured to receive a data storage medium storing control data and content data representing a plurality of still images, the still images representing related pages, the still images comprising:

a first subset stored as copy-protected moving image data; and a second subset stored as non-copy-protected still image data; and at least one processor configured to:

read the copy-protected moving image data and the non-copy-protected still image data as playback data; and process the control data to cause the playback data to be output in a sequence of the pages determined by the playback apparatus.

22. The playback device of claim 21, wherein the processor is configured to read data in a format that provides copy-protection of moving image data and that does not provide copy-protection for still image data.

23. The playback device of claim 22, wherein the format is a Blu-ray format.

24. The playback device of claim 21, further comprising an interface receiving user input, and wherein the processor is configured to determine an order of the sequence by the user input.

25. The playback device of claim 21, wherein the processor is configured to read the copy-protected moving image data in an encrypted format.

26. The playback device of claim 21, wherein:

the processor is configured to read page transition control information for transitioning between the pages, the page transition control information comprising link information.

27. The playback device of claim 26, wherein:

at least one of the pages includes a link, the link specifying remote content stored at a location other than the medium; and the processor is further configured to read an application program stored on the medium for accessing the remote content in response to a selection of the link, according to the link information.

28. The playback device of claim 26, wherein the processor is configured to read the page transition control information comprising at least one of chapter-page information or material information.

29. The playback device of claim 21, wherein:
the moving image data for a page comprises a plurality of frames of the same content; and
the processor is further configured to sequentially output the frames for display at a predetermined frequency.

30. The playback device of claim 21, wherein at least one of the still images corresponds to an enlarged zoomed-in portion of another of the still images.

* * * * *